United States Patent Office 3,655,593
Patented Apr. 11, 1972

3,655,593
POLYMERIC ORGANIC PHOSPHORUS COMPOUNDS
John H. Johnson and William R. Richard, Jr., Kirkwood, Mo., assignors to Monsanto Company, St. Louis, Mo.
No Drawing. Continuation-in-part of application Ser. No. 849,246, July 29, 1969, which is a continuation-in-part of application Ser. No. 392,601, Aug. 27, 1964. This application June 29, 1970, Ser. No. 50,921
Int. Cl. C08g 1/08, 15/00
U.S. Cl. 260—9                                      4 Claims

ABSTRACT OF THE DISCLOSURE

A flameproofing composition which is formed by the reaction product of a trivalent phosphorus halide compound having at least one chlorine or bromine atom attached to the phosphorus atom, a carbonyl compound which is an aldehyde or a ketone, and an ester of a trivalent phosphorus atom. The carbonyl compound may be (1) copolymerization products of olefins with carbon monoxide, such as ethylene/carbon monoxide copolymers, (2) vinyl ketone polymers, (3) polymers with appended aldehyde groups and (4) polymeric dialdehyde starches.

---

This application is a continuation-in-part of our copending application Ser. No. 849,246, filed July 29, 1969, now abandoned, which is in turn a continuation of application Ser. No. 392,601, filed Aug. 27, 1964, now abandoned.

This invention relates in general to organic compounds of phosphorus, and more particularly, to polymeric organic phosphorus compounds and new and improved methods of preparing the same.

In U.S. Pat. No. 3,014,944 to Gail H. Birum, a large group of phosphorus-halogen containing compounds have been described and these compounds have been found to be particularly effective in formation of flame-resistant articles and flame-resistant coatings. However, the compounds defined in the aforesaid patent are all monomeric compounds. The present invention resides in a discovery that the various reactants used to make the various phosphorus-halogen containing compounds described in the aforesaid patent can now be used to covalently and permanently modify a preformed polymer thus imparting enhancement of long lasting flame retardancy. Furthermore, the polymers formed by the present invention may be physically blended into other polymeric specie and produce a physical admixture thereof.

It is the primary object of the present invention to provide a method for flame-proofing polymeric organic compounds.

It is another object of the present invention to provide new and useful polymeric organic phosphorus compounds.

It is an additional object of the present invention to provide a process for increasing the resistance of organic compositions to the action of flames, while retaining a major portion of the useful original physical characteristics of the organic composition.

It is a further object of the present invention to provide polymeric organic phosphorus compounds of the type stated which display good biodegradability properties.

It is also an object of the present invention to provide polymeric organic phosphorus compounds of the type stated having good oxidative and thermal stability, strong resistance to ignition, and which display an inability to propagate flames.

It is another salient object of the present invention to provide polymeric halogen-containing organic phosphorus compounds and a new and improved method of making the same.

With the above and other objects in view, our invention resides in the novel features and form, and combination of elements presently described.

Generally speaking, the present invention is a specific modification of the so-called "Birum Reaction" described more fully in the United States Letters Pat. No. 3,014,944 to Gail H. Birum. The "Birum Reaction" includes three reactants; a trivalent phosphorus halide compound having at least one chlorine or bromine atom attached to the phosphorus atom, a carbonyl compound which is an aldehyde or a ketone, and an ester of a trivalent phosphorus atom.

The present invention is a specific instance of the "Birum Reaction" of U.S. Pat. 3,014,944 applied to polymeric materials containing carbonyl groups. More particularly, the present invention resides in the reaction between a trivalent phophorus compound having one chlorine or bromine atom attached to the phosphorus atom thereof, a polymeric compound having one or more unreacted carbonyl groups and an ester of a trivalent phosphorus acid in which one of the organic groups of said ester is bonded to phosphorus through an oxygen atom.

Included within the scope of the present invention are (1) copolymerization products of olefins with carbon monoxide, such as ethylene/carbon monoxide copolymers, (2) vinyl ketone polymers, (3) polymers with appended aldehyde groups and (4) polymeric dialdehyde starches. The trivalent phosphorus compound is preferably one which does not undergo self-condensation and the triorgano trivalent phosphorus ester is one in which at least one of the organic groups is bonded at an aliphatic carbon to phosphorus through an oxygen atom. In the reaction, one of the halogen atoms on the trivalent phosphorus halide compound is replaced by a phosphinylhydrocarbyloxy group. Consequently, the reaction depends upon the number of halogen atoms initially linked to the phosphorus in the trivalent phosphorus halide compound. Within the scope of the present invention, it is desirable to limit the reaction to specific polymer chains and to prevent cross-linking, and therefore, trivalent phosphorus halide compounds having a single halogen atom are employed with halogen atoms selected from the class consisting of chlorine and bromine. However, if it is desired to produce three dimensional cross-linked networks of polymer chains, then trivalent phosphorus dihalide compounds and trivalent phosphorus trihalide compounds are employed.

The present invention is operable with the four above-mentioned basic types of polymeric carbonyl compounds where the carbonyl group will react in preference, with respect to any other unreacted moiety. The first type of polymeric carbonyl compound which is included within the scope of the present invention, namely the copolymerization products of olefins and carbon monoxide, are represented by the general formula:

$$[-Y'-]_{m'} \left[ -\overset{O}{\underset{\|}{C}}- \right]_{n'}$$

where a monomeric olefinic material is copolymerized with carbon monoxide and the carbon monoxide moiety exists in a definite mole ratio with respect to the polymer. Also included within the scope of the present invention, as compounds which copolymerize with carbon monoxide are olefins having ethylenic unsaturation, vinyl unsaturation, vinylidene unsaturation, etc. The polymers of the present invention exist in a ratio of $m'$ to $n'$ where $m'$ and $n'$ designate the repeating units of olefin and carbon monoxide respectively, and where $m'+n'$ is at least 10 repeating units. Furthermore, $m'$ exists in a range with respect to $n'$ of 50:1 to 1:1. Therefore at a mole ratio of $m'$ to $n'$ of 50:1 the polymer contains 1.96 mole percent of carbon monoxide and at a mole ratio of 1:1 the polymer contains 50 mole percent of carbon monoxide.

If the trivalent phosphorus halide compound were represented by the formula $R'_2PX$ and the triorgano trivalent phosphorus ester were represented by the formula $R''_2POR'''$, using this type of polymeric carbonyl compound, the reaction would proceed as follows:

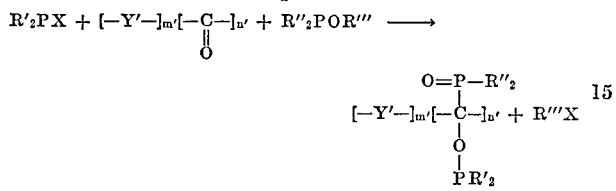

The second type of polymeric carbonyl compound, the vinyl ketone polymers, which are included within the scope of the present invention, are represented by the general formula:

where the carbonyl radical is an appended group. Using this type of polymeric carbonyl compound, the reaction proceeds as follows:

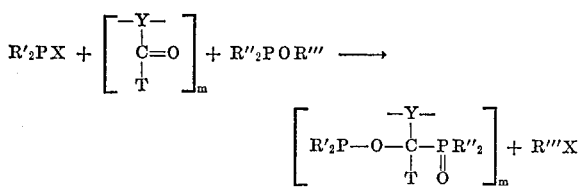

The third type of polymeric carbonyl compound, the polyvinyl aldehydes, which are included within the scope of the present invention are represented by the general formula:

Using this type of polymeric carbonyl compound, the reaction proceeds as follows:

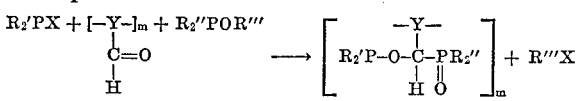

The fourth type of polymeric carbonyl compound, the polymeric dialdehyde starches are represented by the generic formula:

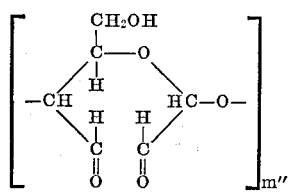

Actually the polymeric dialdehyde starches will contain some unoxidized starch of the following formula:

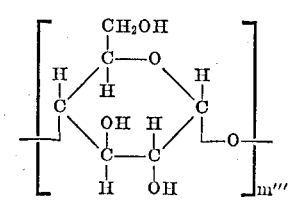

The amount of unoxidized starch will exist in about 1 to 50 mole percent. Therefore, $m''$ will range with respect to $m'''$ in the ratio of 1:1 to 99:1.

Using this type of polymeric carbonyl compound the reaction proceeds as follows:

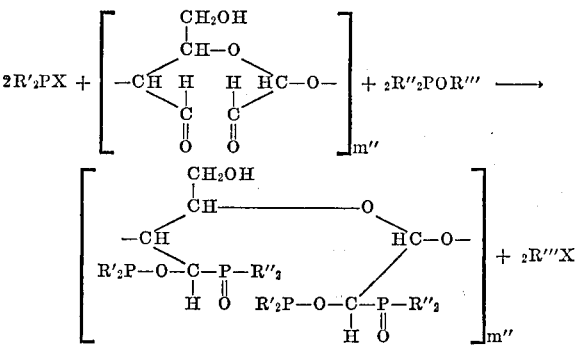

Naturally there may be some unoxidized starch which remains unreacted so that

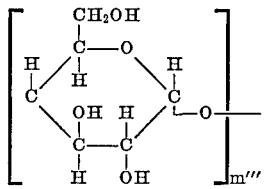

exists in both the initial reactant and the reaction product.

In each of the above designated compounds, the subscripts $m$, $m'$, $m''$ and $m'''$ and the subscripts $n$, $n'$, and $n''$ designate the number of repeating moieties. The subscripts $m'$ and $n'$ regarding the copolymerization products of olefins and carbon monoxide have been defined above. In the aldehydes and ketones of the present invention, $m$ is an integer of at least 10, and in the dialdehyde starches, $m''$ is an integer of at least 3.

X is selected from the class consisting of chlorine and bromine, and the Y' designates one repeating comonomer unit of the copolymer. Y is the repeating unit of a monomeric aldehyde or ketone group. R' is selected from the class consisting of hydrocarbyl-, hydrocarbyloxy-, hydrocarbylthio-, and (hydrocarbyloxy)-hydrocarbyloxy-radicals of from 1 to 12 carbon atoms and such radicals carrying halogen as substituents; alkyl$_{(2)}$N- and (alkyl) (aryl) N-radicals having from 1 to 5 carbon atoms in each alkyl group and 6 to 7 carbon atoms in the aryl group;

$$D\ \ N\text{-radicals}$$

wherein D represents the necessary atoms to make up a saturated N-hetero ring of from 3 to 6 members; and wherein 2 R's taken together stand for a radical selected from the class consisting of bivalent-O-hydrocarbylene-O- and O-halohydrocarbylene-O-radicals which complete a ring with the phosphorus atom, are free of unsaturation, and which contain from 2 to 4 carbon atoms in a chain and a total of from 2 to 12 carbon atoms; R'' is selected from the class consisting of hydrocarbyl, hydrocarbyloxy, and (hydrocarbyloxy)hydrocarbyloxy radicals of from 1 to 12 carbon atoms, and such radicals having halogen as a substituent; R''' is selected from the class consisting of alkyl, alkenyl, aralkyl, and hydrocarbyloxyalkyl radicals of from 1 to 12 carbon atoms, and such radicals having halogen substituents; and T is an alkyl radical of from 1 to 6 carbon atoms or a cycloalkyl radical of 5 to 6 carbon atoms.

TRIVALENT PHOSPHORUS HALIDE COMPOUNDS

The trivalent phosphorus monohalide compounds which have been found to be particularly useful in the present invention can be adequately described as "a trivalent phosphorus halide compound which does not undergo self-condensation and having only one halogen atom selected from the class consisting of chlorine and bromine attached to the phosphorus atom, and where the other two valences are satisfied by (1) members selected from the class consisting of hydrocarbyl radicals of from 1 to 12 carbon atoms, hydrocarbyloxy radicals, hydrocarbylthio radicals, hydrocarbylamido radicals, and where the radicals have from 1 to 12 carbon atoms, or (2) where the two valences taken together form part of a cyclic group bonded to the phosphorus through oxygen." Some of the compounds which are included in this definition can be represented by the general formulae:

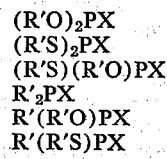

(R'O)₂PX
(R'S)₂PX
(R'S)(R'O)PX
R'₂PX
R'(R'O)PX
R'(R'S)PX wherein R' is a hydrocarbyl radical of from 1 to 12 carbon atoms or said hydrocarbyl radical containing halogen substitution, and X is a member of the class consisting of chlorine and bromine.

Another class of trivalent phosphorus halide compounds which are useful in the present invention are the nitrogenous phosphorus halogen compounds represented by the general formulae:

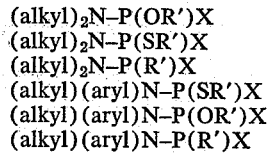

(alkyl)₂N–P(OR')X
(alkyl)₂N–P(SR')X
(alkyl)₂N–P(R')X
(alkyl)(aryl)N–P(SR')X
(alkyl)(aryl)N–P(OR')X
(alkyl)(aryl)N–P(R')X Also included within the scope of the present invention as trivalent phosphorus halide compounds are heterocyclic compounds of the general formulae:

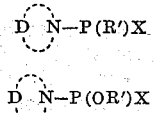

D N–P(R')X

D N–P(OR')X where

D N– is a representative of a saturated N-heterocyclic radical of from 3 to 6 members, and where R' is defined above.

Another group of trivalent phosphorus halide compounds which are contemplated for use in the present invention are the dioxy compounds of the general formula:

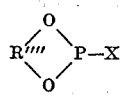

where R'''' is selected from the class consisting of bivalent hydrocarbylene radicals which are free of aliphatic unsaturation and which contain from 2 to 4 carbon atoms in a chain and a total of from 2 to 12 carbon atoms, and halogen substitution products of such radicals; and where X is a member of the class consisting of bromine and chlorine.

Presently useful compounds of the formula (R'O)₂PX are dihydrocarbyl phosphorochloridites or phosphorobromidites or halogen and/or hydrocarbyloxy substitution products thereof. A class of aliphatic trivalent phosphorus halides which are suited for the present purpose includes the dialkyl phosphorochloridites or phosphorobromidites, i.e., compounds of the formula

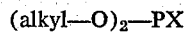

(alkyl—O)₂—PX in which the alkyl radical has from 1 to 12 carbon atoms and X is chlorine or bromine, e.g., dimethyl, diethyl, di- isopropyl, di-n-butyl, di-n-amyl, diisoamyl, di-n-hexyl, di-n-heptyl, bis-(2-ethylhexyl), di-n-octyl, diisononyl, di-n-decyl, di-n-undecyl, di-n-dodecyl or di-tert-dodecyl phosphorochloridite or phosphorobromidite or the mixed esters such as ethyl methyl phosphorochloridite, n-octyl n-propyl phosphorobromidite, tert-amyl n-dodecyl phosphorochloridite, etc.

Also useful are the olefinic or acetylenic esters such as diisoprophenyl, di-2-butenyl, diallyl, di-2-propinyl, dihexenyl didodecenyl, or dioctadienyl phosphorochloridite or bromidite or mixed esters such as ethyl vinyl, allyl butenyl, methyl pentadienyl, butinyl hexinyl or dodecenyl propyl phosphorochloridite or bromidite.

The alkyl, alkenyl or alkinyl radicals of the dialkyl phosphorochloridite or phosphorobromidite may be substituted by one or more hydrocarbyloxy radicals. Examples of presently useful halogenated aliphatic phosphorochloridites or phosphorobromidites are the simple esters such as bis(2-chloroethyl), bis(3-bromopropyl), bis(chloropropenyl), bis(chloropentinyl), bis(dichlorooctyl), bis(2-fluoroethyl), bis(2-ethoxyethyl), bis(4-methoxy-2,3-dichlorobutyl), or bis(2-bromo-2-chloroethyl) phosphorochloridite or phosphorobromidite; the mixed esters such as 2-chloroethyl 3-chloro-2-butenyl phosphorochloridite, dibromohexinyl 3-bromopropyl phosphorochloridite, 2-fluoroethyl tetrachlorobutyl phosphorochloridite or 2-butenyloxyethyl 2-methoxyethyl phosphorobromidite; and mixed esters of both substituted and unsubstituted alcohols such as 2-chloroethyl methyl phosphorochloridite, 2-butenyl dichlorobutyl phosphorochloridite, 2-chloropropyl ethyl phosphorobromidite or 2-ethoxyethyl dodecyl phosphorochloridite.

The corresponding aliphatic phosphorohalidothioites which are presently useful are compounds of the formula

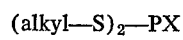

(alkyl—S)₂—PX wherein alkyl and X are as above defined. Such compounds are, for example, dimethyl, diethyl, di-n-butyl, bis(2-ethylhexyl), didodecyl, ethyl methyl, methyl n-octyl or isopropyl methyl phosphorochloridothioite or phosphorobromidothioite. Examples of the presently useful simple or mixed haloalkyl or hydrocarbyloxyalkyl esters are bis(2 - chloroethyl), bis(3 - fluoropropyl), bis[2-(2-chloroethoxy)ethyl] or methyl trichlorobutyl phosphorochloridothioite or phosphorobromidothioite.

Examples of presently useful olefinic or acetylenic phosphorohalidothioites are dipentenyl, diheptinyl, bis(chlorobutenyl), ethyl octenyl, dibromopropyl methoxyprepenyl or fluoroethyl dodecenyl phosphorochloridothioite or phosphorobromidothioite.

Also presently useful are the cycloalkyl esters such as dicyclohexyl, dicyclopentyl, 2,3-dimethylcyclohexyl n-propyl, bis(cyclopentylmethyl), bis(4-ethoxycyclohexyl), bis (4 - idopropenylcyclohexyl) or bis(4 - chlorocyclohexyl) phosphorochloridite or phosphorochloridothioite.

Also useful are the aromatic, aliphatic-aromatic, or aromatic-cycloaliphatic phosphorohalidites, i.e., compounds of the formula

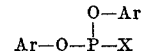

O—Ar
|
Ar—O—P—X in which Ar is a hydrocarbyl radical which contains an aromatic ring and has from 6 to 12 carbon atoms, and X is a chlorine or bromine. Such compounds may be diaryl, bis(alkaryl), bis(aralkyl), bis(cycloalkylaryl), bis(arylcycloalkyl), aryl alkaryl, aryl aralkyl, alkaryl aralkyl or aryl cycloalkyl phosphorohalidites, e.g., diphenyl, di-p-tolyl, di-alpha or beta-naphthyl, bis(4-methoxyphenyl), dibiphenylyl, dimesityl, dicumyl, bis(2-butylphenyl), bis (4-isopropenylphenyl), phenyl alpha-naphthyl, biphenylyl phenyl, 4-ethylphenyl phenyl, bis(2-phenylvinyl), dibenzyl, bis(2-ethylphenyl), bis[3-(2-propinyl)phenyl], bis(cyclohexylphenyl), bis(phenylcyclopentyl), benzyl phenyl, biphenylyl 4-ethylbenzyl, 3-phenyl propyl mesityl, cyclohexyl phenyl or beta-naphthymethyl phenyl phosphorochloridite or phosphorobromidite.

The corresponding phosphorohalidodithioites, i.e., compounds of the formula

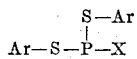

wherein Ar is as defined above, are similarly valuable for the present purpose. Such compounds are, for example, diphenyl phosphorochloridodithioite, bis(4-ethylphenyl) phosphorobromidodithioite, bis(cyclohexylphenyl) phosphorochloridothioite, di-beta-naphthyl phosphorochloridodithioite, biphenylyl phenyl phosphorochloridodithioite, bis(3-phenylpropenyl) phosphorobromidothioite, benzyl alphanapthylmethyl phosphorobromidodithioite, p-tolyl 2-phenylethyl phosphophorochloridodithioite, etc.

Mixed phosphorohalidites or phosphorochloridodithioites, i.e., compounds in which one ester group is aliphatic and the other is aromatic, are likewise useful in the present purpose. Such compounds are, for example, methyl phenyl, phosphorochloridite, 2-chloroethyl alphanaphthyl phosphorochloridodithioite, allyl 2-methylcyclohexyl phosphorobromidite, n-butyl cyclohexyl phosphorochloridite, 2-ethylhexyl 2,3-dichlorophenyl phosphorochloridite, etc.

Presently useful trivalent phosphorus halides also include the O-hydrocarbyl S-hydrocarbyl phosphorochloridothioites, i.e. compounds of the formula

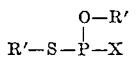

wherein R′ is a hydrocarbyl or hydrocarbyloxyhydrocarbyl radical or such a radical carrying halogen substitution and X is chloride or bromide. Such compounds are, for example, O,S-diphenyl, O,S-dicyclohexyl, O-methyl S-phenyl, O,S-bis(4-chlorophenyl), O,S-bis(4-chlorophenyl), O,S - bis(2 - ethoxyethyl), O-2-propenyl S-p-tolyl, O,S-di-beta-naphthyl, O,S-diethyl, O,S-di-2-hexinyl, O,S-di-m-tolyl O-4-chlorophenyl S-biphenylyl, O-beta-naphthylmethyl S-phenyl, O-4-(2-butenylphenyl) S-2,4-dichlorophenyl or O-n-btuyl S-p-cumyl phosphorochloridothioites or phosphorobromidothioites.

A very valuable class of the presently useful halides includes the dihydrocarbylphosphinous halides, i.e., compounds of the formula

R′₂PX wherein R′ and X are as above defined. Such compounds are e.g., diethylphosphinous bromide, di-2-butenylphosphinous chloride, dimethylphosphinous chloride, diphenylphosphinous chloride, d-2-propinylphosphinous bromide, di-p-tolylphosphinous chloride, dicyclohexylphosphinous chloride, bis(4-hexenylphenyl)phosphinous bromide, bis(2-ethylhexyl)phosphinous chloride, dibenzylphosphinous chloride, dicyclohexenylphosphinous chloride, di-alpha- or beta-naphthylphosphinous chloride, (2-ethylphenyl)phenylphosphinous chloride, benzylbiphenylylphosphinous chloride, bis(4-pentylphenyl)phosphinous chloride, (dodecyl) phenyl-phosphinous bromide, etc.

Also useful in the reaction with aldehydes and triorgano phosphites are the hydrocarbyl hydrocarbylphosphonohalidites and phosphonohalidothioites, i.e., compounds of the formula

wherein R′ and X are as above defined and Z denotes —O— or —S—. Examples of such compounds are methyl, ethyl, 2-propinyl, n-octyl, tert-dodecyl, 2-octenyl, cyclohexyl, phenyl, p-tolyl, 4-(2-propenyl)phenyl, benzyl, alphanaphthyl, or biphenylyl phenylphosphonochloridite or ethylphosphonochloridite; phenyl or 4-ethylphenyl benzylphosphonobromidite; n-butyl or beta-naphthyl cyclopentylphosphonochloridite; cyclohexyl or 2-butenyl biphenylylphosphonochloridothioite; phenyl or ethyl phenylphosphonochloridothioite, etc.

The above dihydrocarbyl phosphorohalidites, hydrocarbylphosphorohalidodithioites, O-hydrocarbyl S-hydrocarbyl phosphorohalidothioites, dihydrocarbylphosphinous halides, hydrocaryl hydrocarbylphosphonohalidites and hydrocarbyl hydrocarbylphosphonohalidothioites may contain one or more hydrocarbyloxy substituents in either an alkyl, aryl or cycloaliphatic portion thereof. Examples of such halogen-substituted compounds are:

bis(2-, 3- or 4-chlorophenyl) phosphorochloridite or phosphorochloridodithioite
bis(2-, 3- or 4-bromophenyl) phosphorobromidite or phosphorobromidodithioite
O-(2-, 3- or 4-chloro or bromophenyl) S-phenyl phosphorochloridothioite
bis(4-methoxy-2-butenyl) phosphorobromidiate or phosphorochloridothioite
bis(2-chloropropyl) phosphorochloridite or phosphorochloridothioite
bis(2-phenoxyethyl) phosphorobromidite or phosphorochloridothioite
bis(4-iodo-2-ethylphenyl) phosphorochloridite or phosphorochloridothioite
bis[(4-fluoroethyl)phenyl]phosphorochloridite or phosphorochloridothioite
bis(pentachlorophenyl) phosphorochloridite or phosphorochloridothioite
bis(alpha-chloro-beta-naphthyl) phosphorochloridite or phosphorochloridothioite
bis(4-ethoxyphenyl) phosphorobromidite or phosphorochloridothioite
4-chlorobenzyl beta-ethoxy-alpha-naphthyl phosphorochloridite or phosphorobromidothioite
bis(dichloro-2-pentyl) phosphorochloridite or phosphorochloridothioite
bis(octachlorobiphenylyl) phosphorochloridite or phosphorochloridothioite
bis(2-chloroethyl) phosphorochloridite or phosphorochloridodithioite
bis(3,4-dibromocyclohexenyl) phosphinous chloride
bis[3-(2-chloroethoxy)propyl]phosphinous chloride
bis(3-fluoropropyl)phosphinous chloride
bis(2-isopropoxyphenyl) phosphinous chloride
bis(cyclohexyloxyphenyl) phosphinous chloride
(2-phenoxyethyl)phenylphosphinous bromide
2-chloroethyl ethylphosphonochloridothioite
3-propoxypropyl 2-propenylphosphonochloridite
tetrachlorobutyl dodecylphosphonochloridite
3-phenoxy-2-chloro-2-butenyl phenylphosphonobromidite
methyl 4-chlorophenylphosphonochloridite
2-chloroethyl 2-chloroethylphosphonochloridite The phosphonamidous halides of the formula

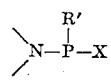

may have included as a substituent thereon a saturated N-heterocyclic

radical or two noncyclic substituents. In the above formula, R′ represents a hydrocarbyl, or a hydrocarbyloxyhydrocarbyl radical or such a radical carrying halogen substitution, and X is chlorine or bromine are also useful. Examples of these are N,N-diethylphenylphosphonamidous chloride and N-methyl-N-phenylethylphosphonamidous chloride, N-ethyl-N-phenyl(4-chlorocyclohexylphosphonoamidous)chloride or N,N-dipentyl(3-phenoxypropyl)phosphonamidous bromide. Piperidino-4-chlorophenylphosphonous chloride is illustrative of a compound in which the nitrogen is present as part of a heterocyclic ring.

Also presently useful are the phosphoramidohalidites and phosphoroamidohalidothioites of the formula

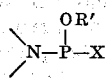

in which R' and X are as above defined. Examples of these are ethyl N,N-dimethylphosphoramidochloridite, cyclopentyl N,N - di - methylphosphoroamidobromidite, phenyl N,N-di-n-butylphosphoramidochloridite, 2-chloroethyl N - ethyl - N-phenylphosphoramidochloridothioite, and benzyl N,N-di-n-amylphosphoramidobromidite. Ethyl morpholinophosphonochloridite is illustrative of a compound in which the nitrogen is present as part of a heterocyclic ring.

Of pronounced utility in the presently provided process are cyclic esters of phosphorohalidous acid. Such esters have the formula

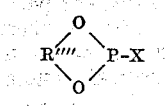

wherein R'''' is selected from the class consisting of bivalent hydrocarbylene radicals which are free of aliphatic unsaturation, and which contain from 2 to 4 carbon atoms in a chain and a total of 2 to 12 carbon atoms, and halogen substitution products of such radicals. Examples of compounds of the above formula are the various 2-halo dioxaphospholanes, dioxaphosphorinanes, and dioxaphosphenanes and benzodioxaphospholes, e.g., 2-chloro or 2-bromo-1,3,2-dioxaphospholane; 2-chloro-4-methyl-1,3,2-dioxaphospholane; 2-bromo-1,3,2-dioxaphosphorinane; 2-chloro-4-methyl-1,3,2-dioxaphosphorinane; 2-chloro-1,3,2-dioxaphosphepane; 2-bromo-5-methyl-1,3,2-dioxaphosphepane; 2-chloro-1,3,2-benzodioxaphosphole; 2-chloro-4,4,5,5 - tetramethyl-1,3,2-dioxaphospholane; 2-chloro-4-chloromethyl-1,3,2-dioxaphospholane; 2,5-dichloro-1,3,2-dioxaphosphorinane, 2,6,7 - trichloro - 1,3,2-benzodioxaphosphole; 2,5 - dibromo - 1,3,2 - dioxaphosphorinane; 2-chloro-5-fluoro-1,3,2-dioxaphosphorinane, etc.

TRIORGANO TRIVALENT PHOSPHORUS ESTERS

The triorgano trivalent phosphorus ester compounds serve to terminate the reaction between the trivalent phosphorus halide compounds and the carbonyl compounds and prevent cross-linkage of the resulting polymer products. The elimination of the triorgano trivalent phosphorus esters would permit cross-linkages between the carbonyl carbon of various polymer chains and result in a three dimensional lattice or network. Moreover, the use of trivalent phosphorus compounds having 2 or 3 halogen atoms attached to the phosphorus atom would produce the same result.

The triorgano phosphorus ester compounds which are suitable for use in the present invention, may be a phosphite, a phosphonite or a phosphinite. Because the phosphites are most readily available, of particular importance for use in the present process are the triorgano esters of phosphorus acid. The more useful of these have the formula $(R''O)_2$—P—$OR'''_2$ where $R''_2$ denotes a radical selected from the class consisting of hydrocarbyl and hydrocarbyloxyhydrocarbyl radicals of from 1 to 12 carbon atoms and such radicals having halogen substitution, and R'' is selected from the class consisting of alkyl, alkenyl, alkinyl aralkyl, and hydrocarbyloxyalkyl radicals of from 1 to 12 carbon atoms and such radicals having halogen substitution. They may be simple or mixed phosphites. Examples of useful phosphites are trimethyl, triethyl, triallyl, triisopropyl, tripropinyl, tri-n-propyl, tribenzyl, tri-n-butyl, tri-2-butenyl, tri-tert-amyl, tri-n-hexyl, trioctenyl, tri-n-heptyl, tris(2-ethylhexyl), tri-n-octyl, trinonyl, tridecyl, triundecyl, tritert-dodecyl, amyl diethyl, butyl di-p-tolyl, ethyl dicyclohexyl, ethyl octyl phenyl, amyl dibenzyl, tris(2-chloroethyl), tris(3-chloropropyl), tris(2-chloropropyl), tris-(2-chloro-2-butenyl, tris(3,4-dichlorobutyl, tris(2-bromoethyl), tris(3-iodopropyl), tris (2 - fluoroethyl), tris(dichlorododecyl), tris(2-ethoxyethyl), tris(2 - phenoxy-propyl), tris(4 - chlorophenoxy) propyl, 2-chloroethyl diethyl, bis(allyloxybutyl) ethyl, diamyl trichlorooctyl, 2-chloroethyl 3-chloropropyl 4-chlorobutyl, 2-chloroethyl methyl propyl, tris(2,3-dichloropropyl), tris(2-methoxy-2-chloropropyl), and benzylbis(3-phenoxy-2-bromopropyl) phosphite.

An adequate definition of a preferred group of triorgano trivalent phosphorus esters usable in the present invention would be a triorgano trivalent phosphorus ester having at least one organic group bonded at an aliphatic carbon to phosphorus through an oxygen atom; and having the general formula $(R'''O)_2$—P—$OR''$ where $R''$ denotes a radical selected from the class consisting of hydrocarbyl and hydrocarbyloxyhydrocarbyl radicals of from 1 to 12 carbon atoms and such radicals having halogen substitution, and $R'''$ is selected from the class consisting of alkyl, alkenyl, alkinyl aralkyl, and hydrocarbyloxyalkyl radicals of from 1 to 12 carbon atoms and such radicals having halogen substitution.

POLYMERIC CARBONYL COMPOUNDS

The classes of carbonyl compounds which are suitable for use in the present invention consist of polymers containing aldehyde and ketone groups and includes polymeric aldehydes, polymeric ketones, copolymerization products of carbon monoxide and olefins, and polymeric dialdehyde starches. These classes by definition include polymeric aldehydes, dialdehydes, and ketones having free carbonyl groups available for reaction with the trivalent phosphorus halide and the trivalent phosphorus ester.

The method of preparing copolymers of carbon monoxide and olefin type compounds is not included within the scope of the present invention and is more fully described in United States Letters Patent No. 2,641,590. However, those compounds which are readily polymerizable with carbon monoxide and which are included within the scope of the present invention include aliphatic monolefins of up to 20 carbon atoms such as ethylene, propylene, the butylenes, the pentalenes, vinyl and vinylidene compounds, fluorinated ethylenes such as vinyl fluoride, vinylidene fluoride, trifluoroethylene and tetrafluoroethylene, vinyl chloride, vinylidene chloride, organic vinyl esters such as vinyl propionate vinyl benzoate, vinyl acetate, vinyl isobutyrate, vinyl laurate, etc. Other polymerizable compounds are vinyl ketones such as methylisopropenyl ketones, styrene, acrylic and methacrylic acids and their derivatives such as esters, nitriles and anhydrides. Other compounds copolymerizable with carbon monoxide include the aliphatic diolefins such as butadiene, isoprene, the pentalenes, etc. Also included are diallyl compounds such as diallyl phthalate, butendioic acids and their derivatives such as maleic and fumaric acids, their esters, nitriles and anhydrides and the like. In essence, any monoethylenically unsaturated monomer or compound or any diethylenically unsaturated monomer or compound of up to 20 carbon atoms copolymerizable with carbon monoxide may be used.

Also included within the scope of the present invention are copolymerization products of carbon monoxide and ethylene with one or more additional polymerizable organic compounds, such as organic compounds which contain at least one terminal methyl group.

Another group of polymeric carbonyl compounds which are suitable for use in the present invention are the polymeric dialdehydes and more particularly those dialdehyde starches which have the following formula

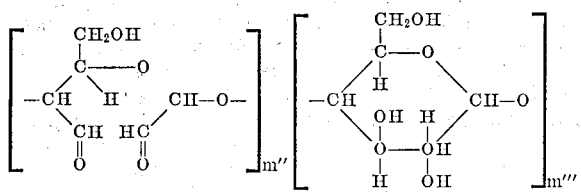

such products being produced under the trademark Sumstar, by the Miles Chemical Company. In the above designated polymeric dialdehyde compounds, $m''$ designates the number of oxidizable moles of starch and is at least 3 repeating units, $m'''$ represents the unoxidized moles of starch and $m''$ exists with respect to $m'''$ in the range of 1:1 to 99:1.

Another group of polymeric carbonyl compounds which are suitable for use in the present invention are alkyl vinyl ketone polymers of the general formula

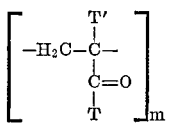

and where $m$ is an integer of at least 10, T is any alkyl or cycloalkyl radical having 6 carbon atoms or less and T' is an alkyl radical of 1 to 5 carbon atoms. Presently useful compounds of this general formula are methyl vinyl ketone polymers, ethyl vinyl ketone polymers, normal propyl vinyl ketone polymers, isopropyl vinyl ketone polymers, primary butyl vinyl ketone polymers, secondary butyl vinyl ketone polymers, tertiary butyl vinyl ketone polymers, and each of the pentyl vinyl ketone polymers i.e., methyl butenyl ketone, ethyl butenyl ketone, n-propyl isobutenyl polymers, etc.

Other polymeric carbonyl compounds suitable for use in the present invention are polyvinyl aldehydes of the general formula

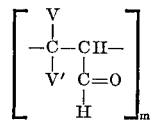

where V and V' are members selected from the class consisting of hydrogen and alkyl radicals of 1 to 10 carbon atoms, and $m$ is an integer of at least 10 compounds included within this general formula are polyacrolein, polymethacrolein and polycrotonaldehyde, etc.

It should be understood that the copolymers and homopolymers of the above mentioned polymeric carbonyl compounds can also be suitably employed in the present invention. Those monomeric compounds which will polymerize with each of the aforementioned ketones are acrylonitrile, vinyl chloride, vinylidene chloride, styrene, 2,5 dichloro-styrene, vinyl acetate, methyl styrene, vinylidine bromide. Those monomeric compounds which will copolymerize with acrolein and methacrolein are methyl acrylate, vinyl acelate, acrylamide, etc.

The polymers which are useful in forming the reaction products of the present invention all constitute thermoplastic resin. As indicated previously, each of the polymers, with the exception of the Sumstar starches, contain at least 10 repeating units. Due to various physical phenomena of the starches, such as OH group interaction to render quanternary structures and rigidity imparted by these structures, only 3 repeating units are necessary to accurately characterize this product as a polymer. It is fairly well recognized that with polymer products in general and accordingly, with the polymer products of the present invention, 10 repeating monomeric units does in fact constitute a polymer. Typically, an oligomer is not observed until less than 5 repeating monomeric units are bonded. The present invention is applicable to essentially any molecular weight range of polymer. The minimum criterion is that the polymeric carbonyl compound must in fact be a polymer and not a monomer or oligomer. Therefore, as used herein in both the specification and appended claims, the term "polymer" shall mean at least 3 repeating units and when applicable to the alkyl-carbon monoxide copolymers, ketone or aldehyde polymeric carbonyl compounds, at least 10 repeating units.

The polymers useful in the present invention are clearly distinguishable from the monomers and the oligomers by such physical characteristics as low volatility of the compounds or the ability of the chain molecules to interact in various intermolecular chain reactions. The higher the molecular weight of the polymer, better physical strength properties are achieved. The lower molecular weight polymers can be incorporated into other preformed polymers or other compounds for introducing permanent flameproofing properties into these other compounds.

REACTION PRODUCTS

When the carbonyl compound is a polymeric material which is the resultant reaction product of a monomeric material and carbon monoxide, and this carbonyl compound is reacted with a trivalent phosphorus halide compound and a triorgano trivalent phosphorus ester in accordance with the present invention, the reaction product will have the following general formula

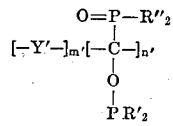

where Y' is any of the moieties above mentioned, which polymerize with carbon monoxide, $m'$ and $n'$ are the moles of the monomeric olefinic repeating units and carbon monoxide, respectively, and where the percentage of carbon monoxide with respect to the total composition is not less than 1.0% and not more than 50%, R' is a member of the class consisting of hydrocarbyl-, hydrocarbyloxy-, hydrocarbylthio-, and (hydrocarbyloxy) hydrocarbyloxy- radicals of from 1 to 12 carbon atoms and such radicals carrying halogen as substituents, (alkyl)$_2$N- and (alkyl) (aryl) N-radicals having from 1 to 5 carbon atoms in each alkyl group and 6 to 7 carbon atoms in the aryl group;

$$\overset{\frown}{D\ \ N}\text{-radicals}$$

wherein D represents the necessary atoms to make up a saturated N-hetero ring of from 3 to 6 members; and wherein 2 R's taken together stand for a radical selected from the class consisting of bivalent-O-hydrocarbylene-O- and -O-halohydrocarbylene-O-radicals which complete a ring with the phosphorus atom, are free of unsaturation, and which contain from 2 to 4 carbon atoms in a chain and a total of from 2 to 12 carbon atoms; and R'' is selected from the class consisting of hydrocarbyl, hydrocarbyloxy, and (hydrocarbyloxy)hydrocarbyloxy radicals of from 1 to 12 carbon atoms, and such radicals having halogen as a substituent.

To impart flame-proofing properties to the polymer, the reaction should be complete enough so that the polymer contains from about 0.3 to about 3.0% phosphorus by weight. Moreover, it is possible to add carbonyl moieties (carbon monoxide) in a range of .1 to 50 mole percent with respect to the repeating monomeric units. It may be desirable to use less than 50% carbonyl moieties since the addition of too much phosphorus in the reaction product, might change the physical characteristic of the original polymer. To provide good oxidation stability, it is necessary to react all of the unreacted carbonyl moieties contained in the polymer. However, where biodegradability is sought, it is possible to react less than 100% of the carbonyl moieties. If something less than 100% of the carbonyl radicals were reacted with a triorgano trivalent phosphorus ester and a trivalent phosphorus halide compound, a reaction product of the following formula would be obtained:

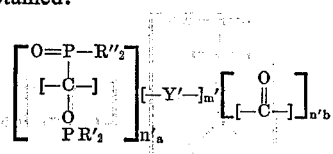

where Y', R', R" and m' are as above described and where n' represents the total number of reacted and unreacted units of carbonyl moiety, $n'_a$ represents the amount of reacted carbonyl moiety and $n'_b$ represents the amount of unreacted carbonyl moiety. Naturally, the sum of $n'_a$ plus $n'_b$ is equal to $n'$ and $n'_b$ ranges from 0 to 40 mole percent of $n'_a+n'_b$ and preferably from 0 to 25 mole percent of the sum of $n'_a+n'_b$. In other words, the amount of reacted and unreacted radicals could be described as

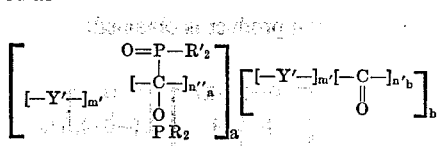

and a and b represent the moles of reacted and unreacted repeating units respectively in the polymer, and wherein b ranges from 0 to 40 mole percent and preferably 0 to 25 mole percent of the sum of a+b. Best results are obtained where at least 75% of the original carbonyl groups are converted to the phosphorus substituted carbonyl group.

When the carbon monoxide/olefin copolymer is reacted with a triorgano trivalent phosphorus ester and a trivalent phosphorus halide compound of the formula:

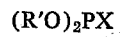
(R'O)₂PX the following reaction product is obtained:

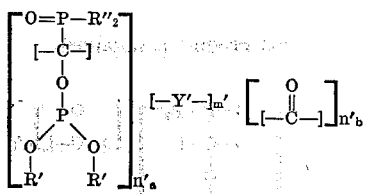

Thus, if in the above example —Y'— was ethylene, the obtainable reaction product would be

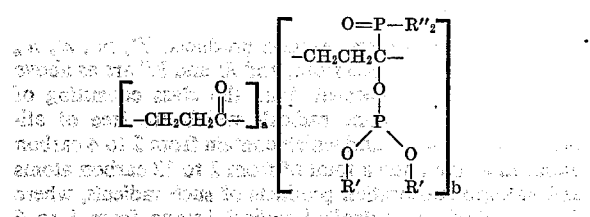

When the trivalent phosphorus halide employed in the above reaction has the general formula:

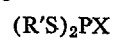
(R'S)₂PX the reaction product will have the general formula:

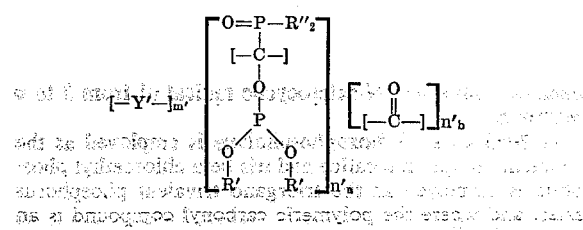

When the carbon monoxide/olefin copolymer is reacted with a triorgano trivalent phosphorus ester and a trivalent phosphorus halide of the formula:

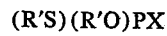
(R'S)(R'O)PX the following reaction product is obtained:

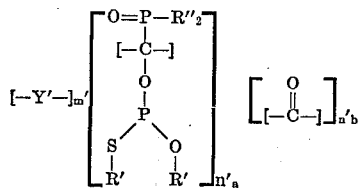

When the carbon monoxide/olefin copolymer is reacted with a triorgano trivalent phosphorus ester and a trivalent phosphorus halide of the formula:

R'(R'O)PX the following reaction product is obtained:

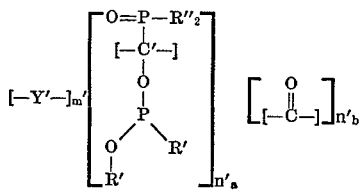

When the carbon monoxide/olefin copolymer is reacted with a triorgano phosphorus ester and a trivalent phosphorus halide of the formula:

R'(R'S)PX the following reaction product is obtained:

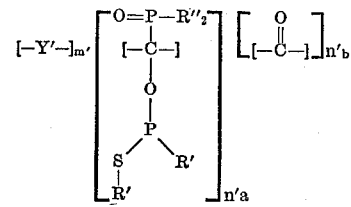

In each of the above formulas, R is a hydrocarbyl radical of from 1 to 12 carbon atoms or said hydrocarbyl radical containing halogen substitution and where X is a chlorine or bromine atom.

When the carbon monoxide/olefin copolymer is reacted with a triorgano trivalent phosphorus ester and a trivalent phosphorus halide of the formula:

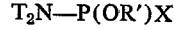
T₂N—P(OR')X the following reaction product is obtained:

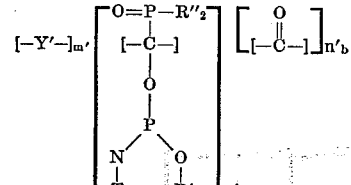

When the carbon monoxide/olefin copolymer is reacted with a trioorgano trivalent phosphorus ester a trivalent phosphorus halide of the formula:

T₂N—P(SR')X the following reaction product is obtained:

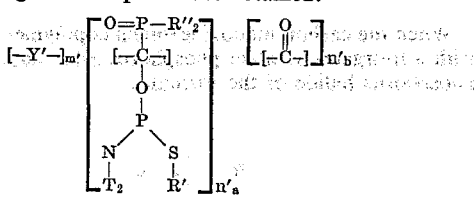

When the carbon monoxide/olefin copolymer is reacted with a triorgano trivalent ester and a trivalent phosphorus halide of the formula:

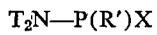
$$T_2N—P(R')X$$

the following reaction product is obtained:

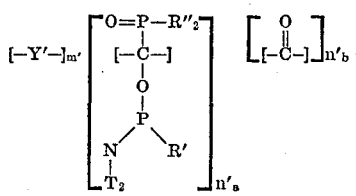

When the carbon monoxide/olefin copolymer is reacted with a triorgano trivalent phosphorus ester and a trivalent phosphorus halide of the formula:

$$(T)(Ar)N—P(SR')X$$

the following reaction product is obtained:

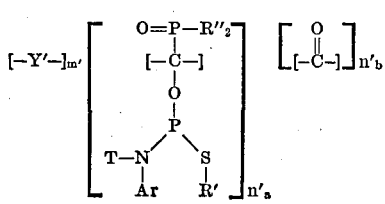

When the carbon monoxide/olefin copolymer is reacted with a triorgano trivalent phosphorus ester and a trivalent phosphorus halide of the formula:

$$(T)(Ar)N—P(OR')X$$

the following reaction product is obtained:

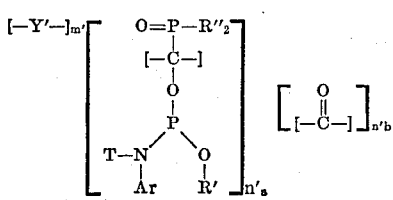

When the carbon monoxide/olefin copolymer is reacted with a triorgano trivalent phosphorus ester and a trivalent phosphorus compound of the formula:

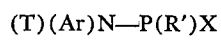
$$(T)(Ar)N—P(R')X$$

the following reaction product is obtained:

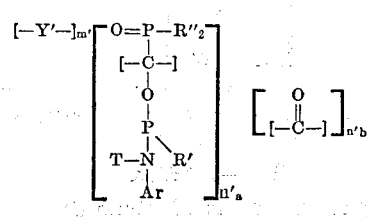

When the carbon monoxide/olefin copolymer is reacted with a triorgano trivalent phosphorus ester and a trivalent phosphorus halide of the formula:

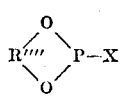

the following reaction product is obtained:

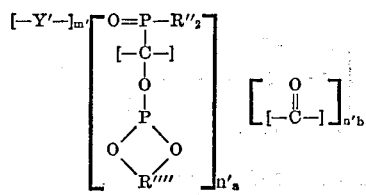

When the carbon monoxide/olefin copolymer is reacted with a triorgano trivalent phosphorus ester and a trivalent phosphorus halide of the formula:

the following reaction product is obtained:

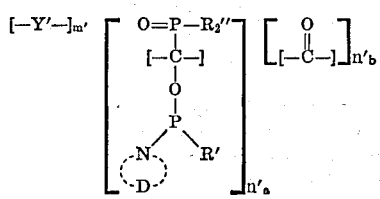

When the carbon monoxide/olefin copolymer is reacted with a triorgano trivalent phosphorus ester and a trivalent phosphorus halide of the formula:

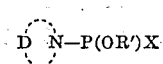

the following reaction product is obtained:

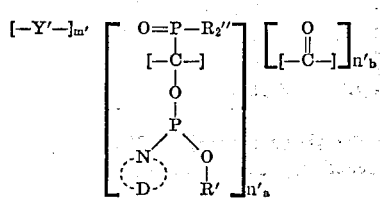

In each of the above reaction products, $Y'$, $m'$, $n'$, $n'_a$ and $n'_b$ are as above described, and $R'$ and $R''$ are as above described. $R''''$ is selected from the class consisting of bivalent hydrocarbylene radicals which are free of aliphatic unsaturation, and which contain from 2 to 4 carbon atoms in a chain and a total of from 2 to 12 carbon atoms and halogen substitution products of such radicals, where T is an alkyl or cycloalkyl radical having from 1 to 6 carbon atoms and Ar is an aryl radical having from 6 to 7 carbon atoms, and

denotes a saturated N-heterocyclic radical of from 3 to 6 members.

If 2-chloro-1,3,2-dioxaphospholane is employed as the trivalent phosphorus halide and tris-beta-chloroethyl phosphite is employed as the triorgano trivalent phosphorus ester, and where the polymeric carbonyl compound is an ethylene/carbon monoxide copolymer, the reaction proceeds as follows:

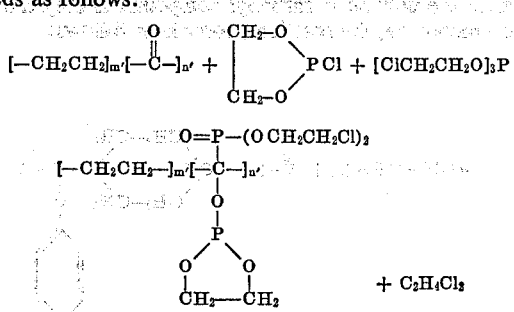

When bis(3-bromopropyl)phosphorobromidodithioite) is employed as the trivalent phosphorus halide and tris-beta-chloroethyl phosphite is employed as the triorgano trivalent phosphorus esters, and where the polymeric carbonyl compound is ethylene/carbon monoxide, the reaction proceeds as follows:

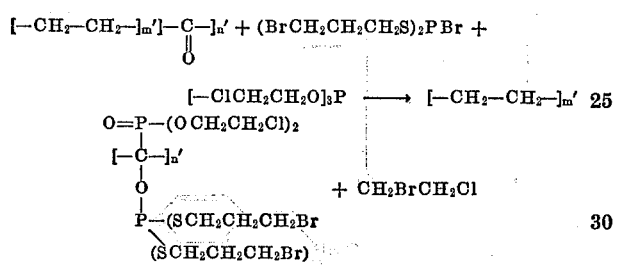

When diethylphosphinous bromide is employed as the trivalent phosphorus halide and tris-beta-chloroethyl phosphite is employed as the triorgano trivalent phosphorus ester, and where the polymeric carbonyl compound is ethylene/carbon monoxide, the reaction proceeds as follows:

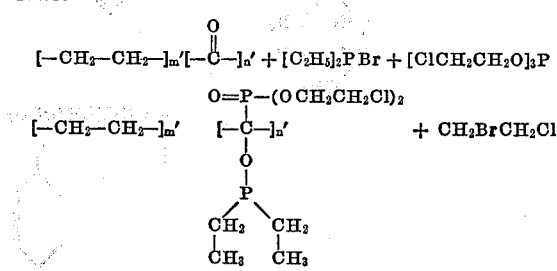

When O,S-bis(4-chlorophenyl)phosphorochloridothioite is employed as the trivalent phosphorus halide and tri-beta-chloroethyl phosphite is employed as the triorgano trivalent phosphorus ester, and where the polymeric carbonyl compound is ethylene/carbon monoxide the reaction proceeds as follows:

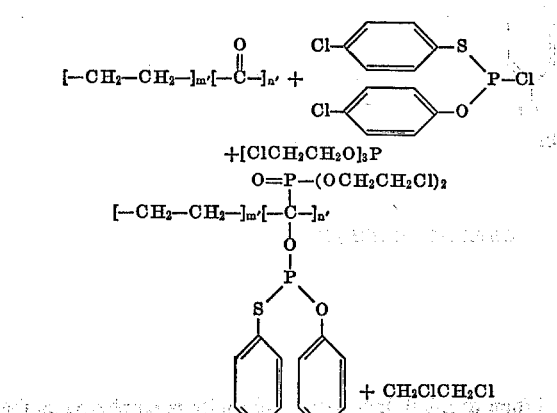

When bis[(4-fluoroethyl)phenyl]phosphorochloridite is employed as the trivalent phosphorus compound and tris (3-methoxy-2-chloropropyl)phosphite is employed as the triorgano trivalent phosphorus ester, and where the polymeric carbonyl compound is ethylene/carbon monoxide, the reaction proceeds as follows:

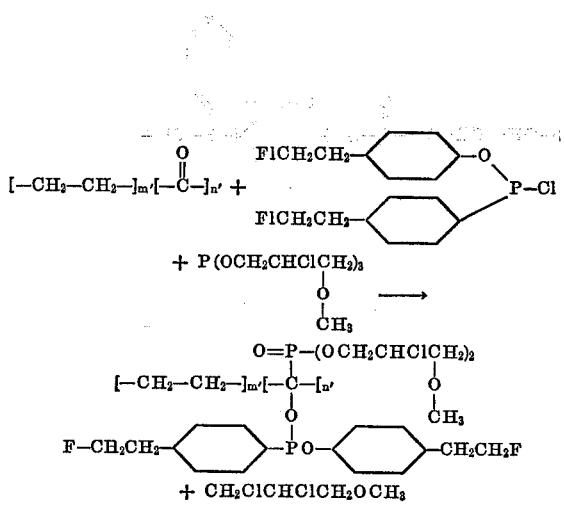

When bis(4-ethoxyphenyl) phosphorochloridothioite is employed as the trivalent phosphorus halide and tris(3-methoxy-2-chloropropyl)phosphite is employed as the triorgano trivalent phosphorus ester and where the polymeric carbonyl compound is ethylene/carbon monoxide, the reaction proceeds as follows:

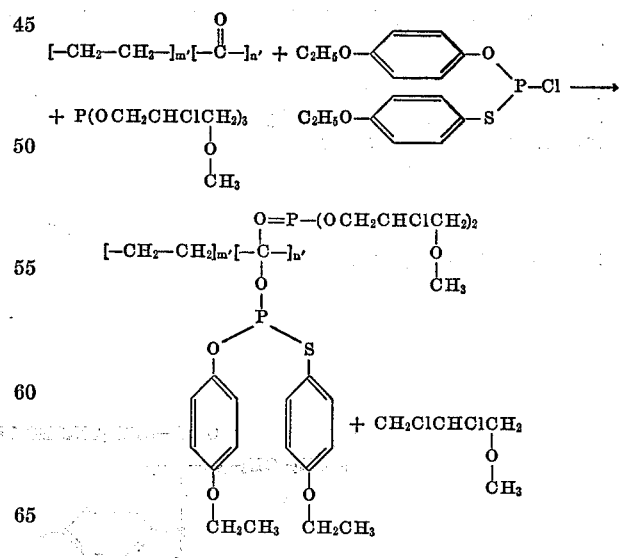

When N,N-diethylphenylphosphonamidous chloride is employed as the trivalent phosphorus halide and benzyl bis(3-phenoxy-2-bromopropyl) phosphite is employed as the triorgano trivalent phosphorus ester, and where the polymeric carbonyl compound is ethylene/carbon monoxide, the reaction proceeds as follows:

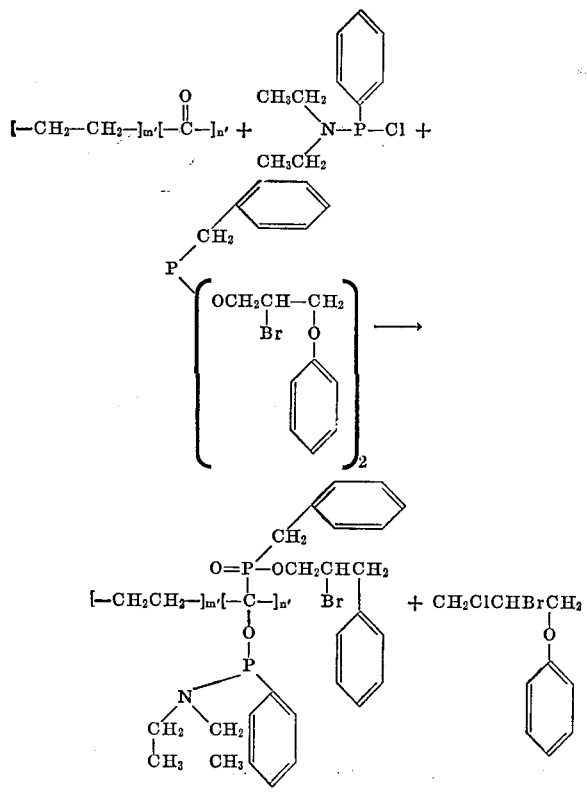

When 4 - chlorophenyl piperidinophosphoramidous chloride is employed as the trivalent phosphorus halide and tris(3,4 - dichlorobutyl) phosphite is employed as the triorgano trivalent phosphorus ester, and where the polymeric carbonyl compound is ethylene/carbon monoxide, the reaction proceeds as follows:

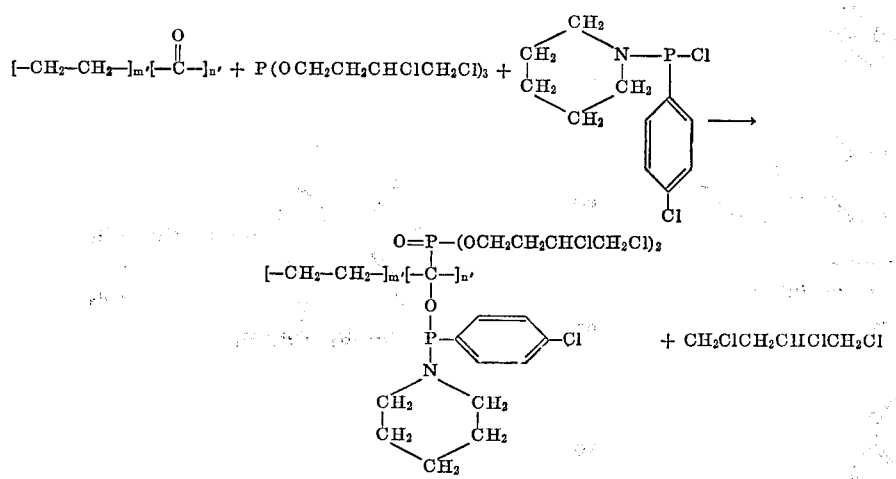

When 4 - chlorophenyl piperidinophosphoramidous chloride is employed as the trivalent phosphorus halide and benzyl bis-(3-phenoxy-2-bromopropyl phosphonite is employed as the triorgano trivalent phosphorus ester and where the polymeric carbonyl compound is ethylene/carbon monoxide, the reaction proceeds as follows:

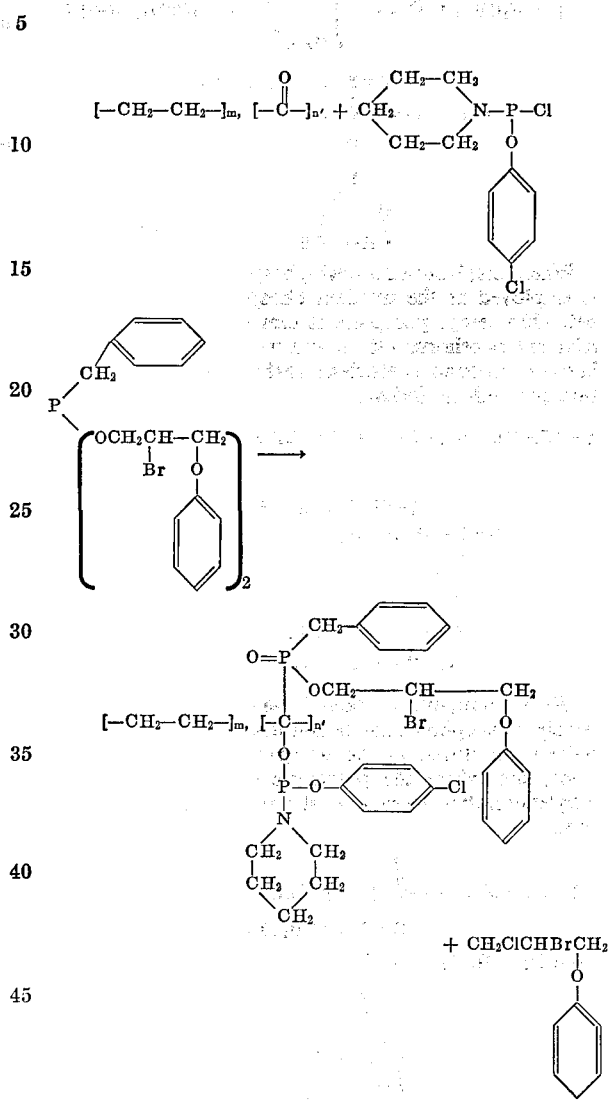

When di-n-butylphosphorochloridite is employed as the trivalent phosphorus halide and trisbeta-chloroethyl phosphite is employed as the triorgano trivalent phosphorus ester, and where the polymeric carbonyl compound is ethylene/carbon monoxide, the reaction proceeds as follows:

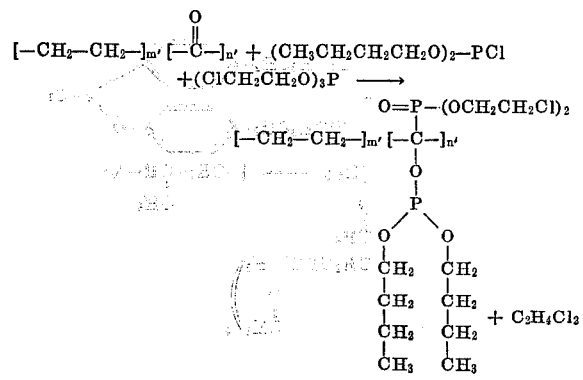

When phenyl N, N-di-n-butylphosphoramidochloridite is employed as the trivalent phosphorus compound and tris(2-chloroethyl)phosphite is employed as the triorgano trivalent phosphorus ester and where the polymeric carbonyl compound is ethylene/carbon monoxide, the reaction proceeds as follows:

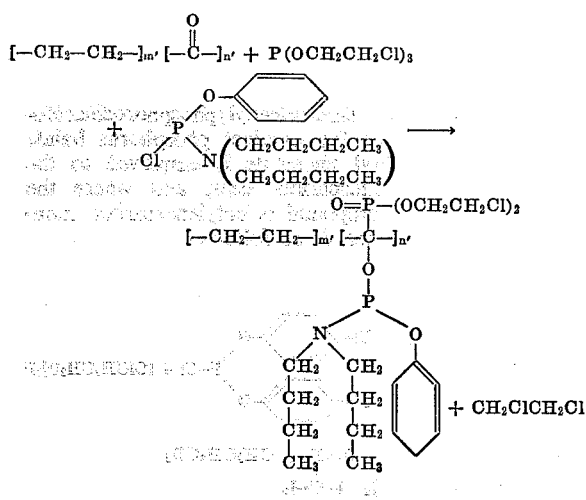

When S-(2 - chloroethyl) N-ethyl-N-phenylphosphoramido-chloridothioite is employed as the trivalent phosphorus halide and tris(2 - bromoethyl)phosphite is employed as the triorgano trivalent phosphorus ester and where the polymeric carbonyl compound is ethylene/carbon monoxide, the reaction proceeds as follows:

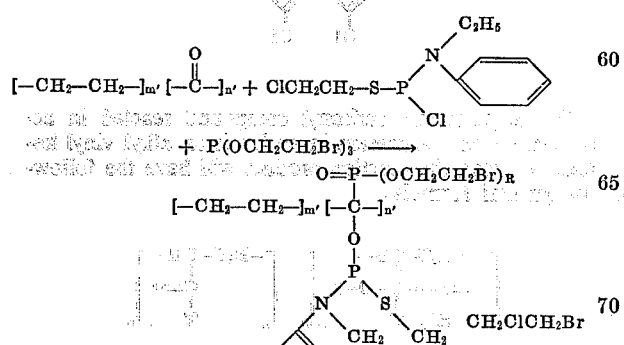

When 2 - chloroethyl N-ethyl-N-phenylphosphoramidochloridite is employed as the trivalent phosphorus halide and tris(2-chloroethyl)phosphite is employed as the triorgano trivalent phosphorus ester and where the polymeric carbonyl compound is ethylene/carbon monoxide, the reaction proceeds as follows:

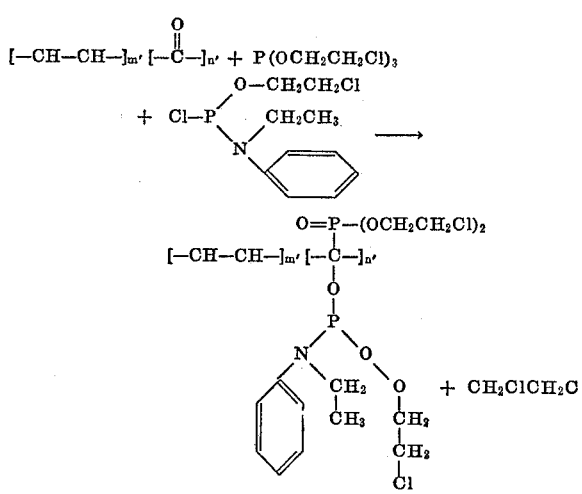

Similarly when S - phenyl - N,N - di - n-butylphosphoramidochloridothioite is employed as the trivalent phosphorus halide and tris(2 - chloroethyl)phosphite is employed as the triorgano trivalent phosphorus ester and where the polymeric carbonyl compound is ethylene/carbon monoxide, the reaction proceeds as follows:

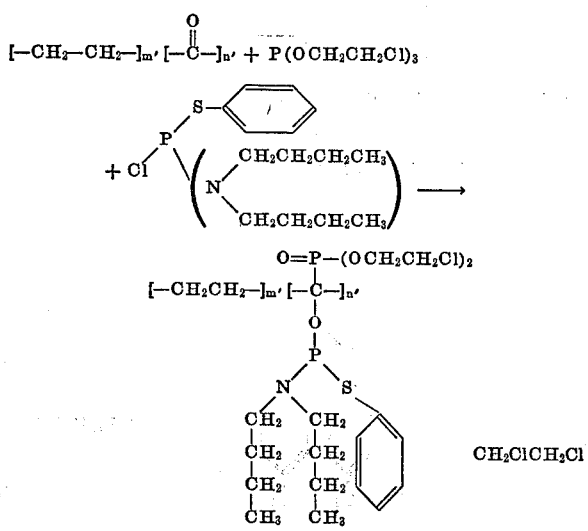

When phenyl - N,N-di-n-ethylphosphoramidochloridite is employed as the trivalent phosphorus halide and 2-chloroethyl di-ethyl phosphite is employed as the triorgano trivalent phosphorus ester and where the polymeric carbonyl compound is ethylene/carbon monoxide, the reaction would proceed as follows:

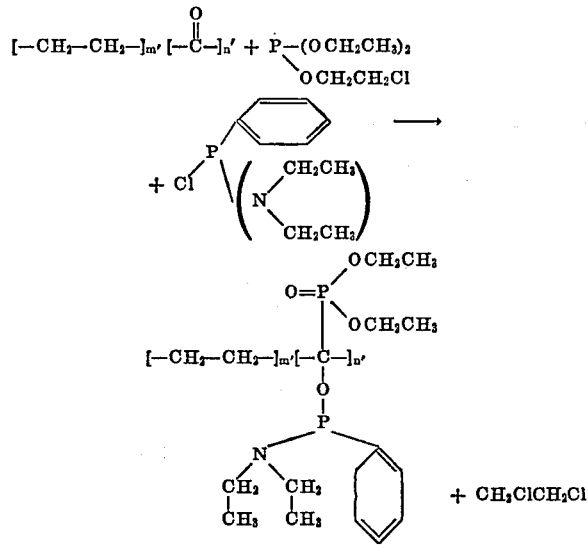

When O,S - bis(4 - chlorophenyl)phosphorochloridothioite is employed as the trivalent phosphorus halide and tris-betachloroethyl phosphite is employed as the triorgano trivalent phosphorus ester, and where the polymeric carbonyl compound is propylene/carbon monoxide the reaction proceeds as follows:

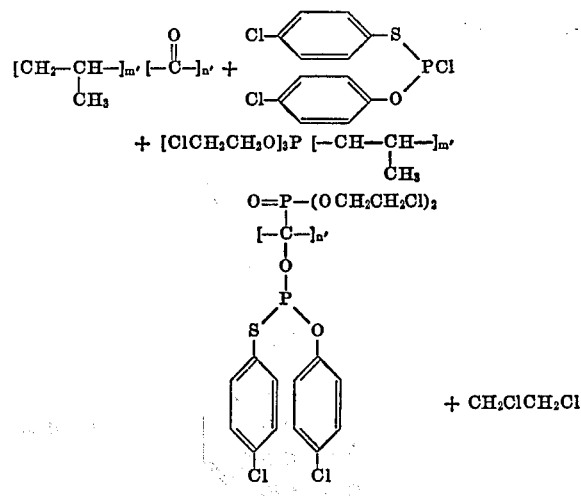

When bis[(4 - fluoroethyl)phenyl] phosphorochloridite is employed as the trivalent phosphorus compound and tris(3 - methoxy - 2 - chloropropyl)phosphite is employed as the triorgano trivalent phosphorus ester, and where the polymeric carbonyl compound is propylene/carbon monoxide, the reaction proceeds as follows:

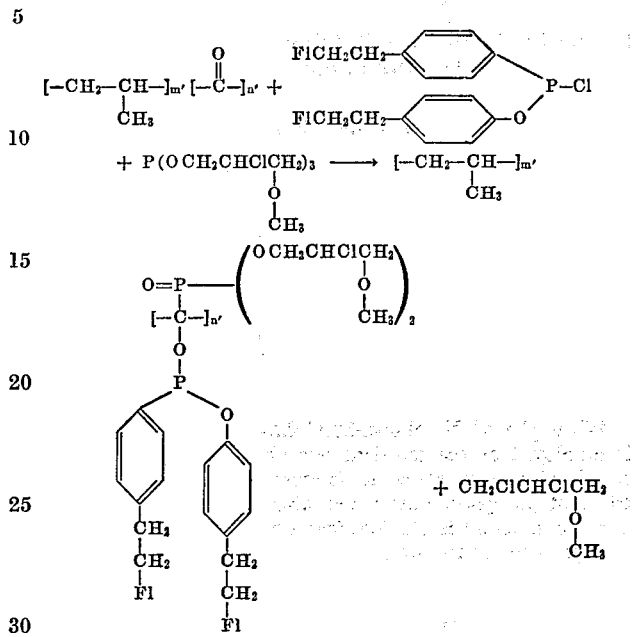

When O,S - bis(4 - chlorophenyl)phosphorochloridothioite is employed as the trivalent phosphorus halide and tris-betachloroethyl phosphite is employed as the triorgano trivalent phosphorus ester, and where the polymeric carbonyl compound is butylene/carbon monoxide the reaction proceeds as follows:

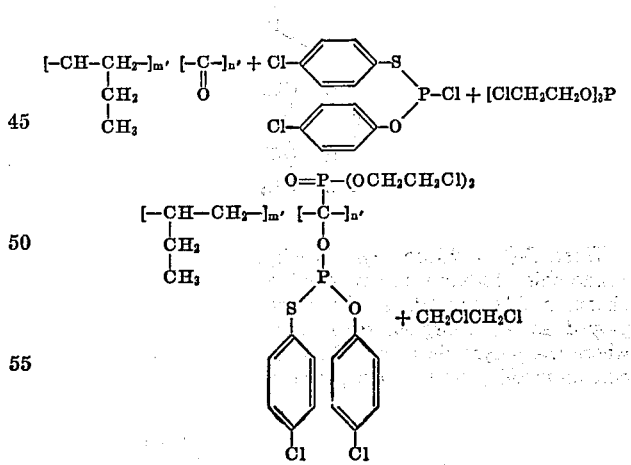

If the polymeric carbonyl compound reacted in accordance with the present invention is an alkyl vinyl ketone polymer, the reaction product will have the following general formula:

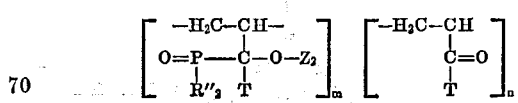

where T and the two R'' radicals are above described, $m$ designates the number of reacted moieties and is an integer of at least 10, $n$ represents the number of unreacted moieties and where the sum of $m+n$ is 100% and $n$ ranges from 0 to 40 mole percent and preferably 0 to 25 mole percent of the sum of $m+n$, and Z will be more fully described in detail hereinafter. In many of the reactions and reaction products hereinafter described, the unreacted moiety represented by [ ]$_n$ is not set forth. However, it should be understood that some unreacted moieties may exist.

If the polymeric carbonyl compound reacted in accordance with the present invention is a vinyl aldehyde polymer, the reaction product assumes the following general formula:

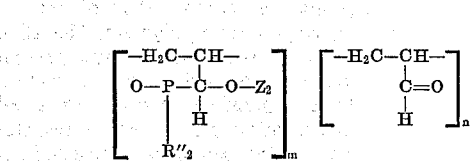

where the two R" radicals are above described, and Z will be hereinafter described more fully in detail.

If the polymeric carbonyl compound reacted in accordance with the present invention is a dialdehyde starch, the reaction product has the following general formula

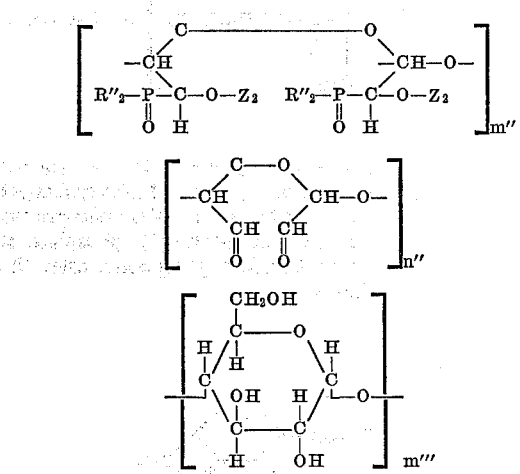

where R" is described above, $m''$ designates the number of oxidized reacted moieties and is an integer of at least 3, $n''$ represents the number of oxidized unreacted moieties and $m'''$ represents the number of unoxidized unreacted moieties and where the sum of $m''+n''+m'''$ is 100% of the polymer and $n''$ ranges from 0 to 40 mole percent, and preferably 0 to 25 mole percent of the sum of $m''+n''$, $m'''$ ranges from 1% to 50% of the sum of $m''+m'''-n''$ and Z will be hereinafter described more fully in detail.

It can be seen that the unoxidized portion of the starch will remain unreacted and the number of unoxidized moles of starch that remain unoxidized will also remain unreacted and will be present in such percentage in the reaction product. In the following description of reaction products and in the accompanying examples, the unoxidized moles of starch will not be described or illustrated inasmuch as such moieties exist in both the reactant starch and the reaction product in substantially the same form.

In general, it is best to react the various carbonyl containing moieties sufficiently to obtain an overall composition where phosphorus comprises not less than 0.3% and not more than 3.0% by weight of the total composition. However, the ranges of "$m$" and "$n$" previously described typically fall within the percentage range of 0.3% to 3.0%. Naturally, the amount of carbonyl moieties reacted will, of course, depend upon the structure of the polymer which is being reacted.

In the following examples, the average mole weights of the polymers are set forth. However, the compositions of the present invention contain a distribution of like species with varying polymeric weights. Accordingly, one ketone polymer, for example, may contain chains of varying molecular weights within a fairly wide range. In many polymers such as Bovine ribonuclease all of the molecules have a precise molecular weight of 13,683. In a sample of polystyrene, however, with an average mole weight of 100,000 there may be molecules with a molecular weight of 5,000 and molecules with a molecular weight of 2,000,000. In such a polymer, there are $N_1$ molecules with molecular weights between 5000 and 15,000, $N_2$ molecules with molecular weights between 15,000 and 25,000, $N_3$ with molecular weights between 25,000 and 30,000 etc. Thus, the total number of molecules, N, is $$N = {}_iN_i$$

where $i$ designates molecules in a given molecular-weight range, say between 25,000 and 30,000. The same holds true in the polymers of the present invention. The discussion of the molecular weight of polymers is more fully set forth in the "Structure of Polymers," M. L. Miller, Reinhold Publishing Co., New York (1966), pages 5–41. Accordingly, a number of techniques of molecular weight determination are employed, such as the weight average molecular weight and the number average molecular weight. These techniques are known in the art and are, therefore, not described in any detail herein. For a more complete discussion of determination of molecular weights, see "Principles of Polymer Chemistry," Paul J. Flory, Cornell University Press, Ithica, New York, 1953, pages 266–315.

Polymers in essentially all weight ranges in accordance with the present invention have potential utility. With the exception of the dialdehyde starches, those compounds which have at least 10 repeating units can be considered polymers in accordance with the present invention. Those dialdehyde starches having at least 3 repeating units can be considered "polymers." In accordance with the present invention any compounds having less than the specified number of repeating units would be considered oligomers. Clearly those compounds which are considered polymers in the present invention exhibit properties of polymers such as low volatility, molecular chain reaction, the ability of the chain molecules to interact, better physical strength, etc.

Furthermore, it is desirable to have at least the designated number of repeating units so that the compounds of the present invention can be polyblended and can be incorporated as flameproofing agents in other compounds. By virtue of their properties, the polymers of the present invention are essentially thermoplastic resins. Accordingly, one major facet of the invention lies in the incorporation of phosphorus into the polymer without substantially altering the physical or chemical properties of the polymers. Another major facet of the present invention resides in the incorporation of phosphorus into a polymer where the amount of phosphorus incorporation may alter polymer characteristics but where the polymer is blended into other polymeric species to guide flame retardancy.

In each of the above mentioned reaction products, Z will have the formula shown in Table A when a selected trivalent phosphorus halide compound is reacted in accordance with the present invention.

TABLE A

| Trivalent phosphorus compound | Z |
|---|---|
| $(RO)_2PX$ | $-P\begin{smallmatrix}O-R\\O-R\end{smallmatrix}$ |
| $(RS)_2PX$ | $-P\begin{smallmatrix}S-R\\S-R\end{smallmatrix}$ |
| $(RS)(RO)PX$ | $-P\begin{smallmatrix}S-R\\O-R\end{smallmatrix}$ |
| $R(RO)PX$ | $-P\begin{smallmatrix}O-R\\R\end{smallmatrix}$ |
| $R(RS)PX$ | $-P\begin{smallmatrix}S-R\\R\end{smallmatrix}$ |
| $T_2N-P(OR)X$ | $-P\begin{smallmatrix}O-R\\N-T_2\end{smallmatrix}$ |
| $T_2N-P(SR)X$ | $-P\begin{smallmatrix}S-R\\N-T_2\end{smallmatrix}$ |
| $T_2NOP(R)X$ | $-P\begin{smallmatrix}R\\N-T_2\end{smallmatrix}$ |
| $(T)(Ar)N-P(SR)X$ | $-P\begin{smallmatrix}S-R\\Ar\\N\\T\end{smallmatrix}$ |
| $(T)(Ar)N-P(OR)X$ | $-P\begin{smallmatrix}O-R\\Ar\\N\\T\end{smallmatrix}$ |
| $(T)(Ar)N-P(R)X$ | $-P\begin{smallmatrix}R\\Ar\\N\\T\end{smallmatrix}$ |
| $R''''\begin{smallmatrix}O\\O\end{smallmatrix}P-X$ | $-P\begin{smallmatrix}O\\O\end{smallmatrix}R''''$ |
| $\overset{\frown}{D\ N}-P(R)X$ | $-P\begin{smallmatrix}R\\\overset{\frown}{N\ D}\end{smallmatrix}$ |
| $\overset{\frown}{D\ N}-P(OR)X$ | $-P\begin{smallmatrix}O-R\\\overset{\frown}{N\ D}\end{smallmatrix}$ |

In Table A, T is an alkyl radical which has from 1 to 6 carbon atoms or a cycloalkyl radical which has from 5 to 6 carbon atoms and Ar is an aryl radical which has from 6 to 7 carbon atoms,

denotes a saturated N-heterocyclic radical of from 3 to 6 members. In the dioxy ring formula, $R''''$ is selected from the class consisting of bivalent hydrocarbylene radicals which are free of aliphatic unsaturation, which contain from 2 to 4 carbon atoms in a chain and a total of from 2 to 12 carbon atoms, and halogen-substitution products of such heterocyclic radicals.

The following reactions are representative of the reactions employing alkyl vinyl ketone polymers. The alkyl vinyl ketone polymers react according to the same general scheme as the olefin/carbon monoxide copolymerization products described above. Therefore in order to avoid undue length of this specification only a few representative reactions of polymethyl vinyl ketone with selected trivalent phosphorus compounds are given. Where methyl vinyl ketone polymer is the selected polymeric carbonyl compound, 2-chloro-1,3,2-dioxaphospholane is selected as the trivalent phosphorus halide and tris-beta-chloroethyl phosphite is selected as the triorgano trivalent phosphorus ester the reaction proceeds as follows:

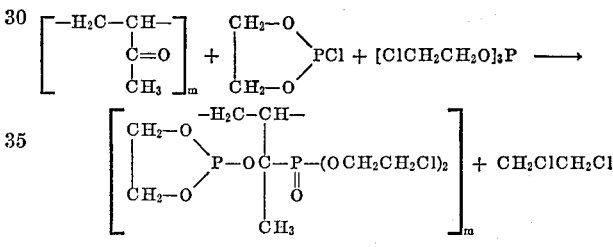

Where methyl vinyl ketone polymer is the selected polymeric carbonyl compound, bis (4-ethoxyphenyl) phosphorochloridite is selected as the trivalent phosphorus halide and tris(3-methoxy-2-chloropropyl) phosphite is selected as the triorgano trivalent phosphorus ester the reaction proceeds as follows:

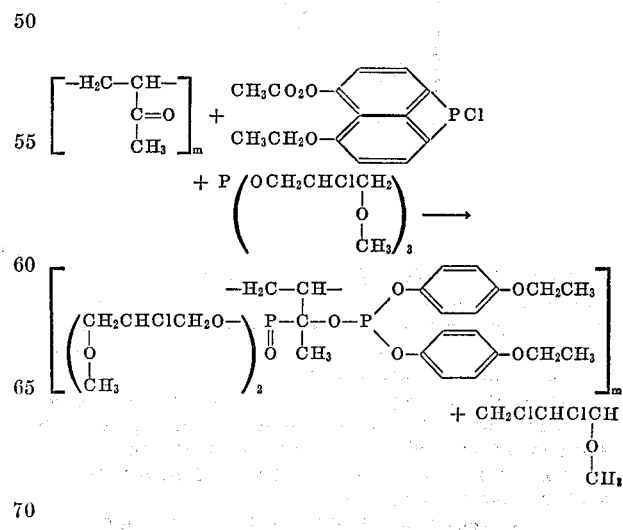

Where methyl vinyl ketone polymer is the selected polymeric carbonyl compound, phenyl N,N - di - n - butylphosphoramidochloridite is selected as the trivalent phosphorus halide and tris(2-chloroethyl) phosphite is selected as the triorgano trivalent phosphorus ester the reaction proceeds as follows:

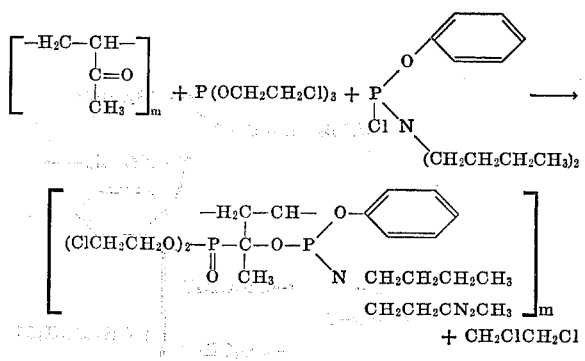

Where methyl vinyl ketone polymer is the selected polymeric carbonyl compound piperidino - 4 - chlorophenyl - phosphorus chloride is selected as the trivalent phosphorus halide and benzyl - bis - (3 - phenoxy - 2 - bromopropyl) phosphite is selected as the triorgano trivalent phosphorus ester the reaction proceeds as follows:

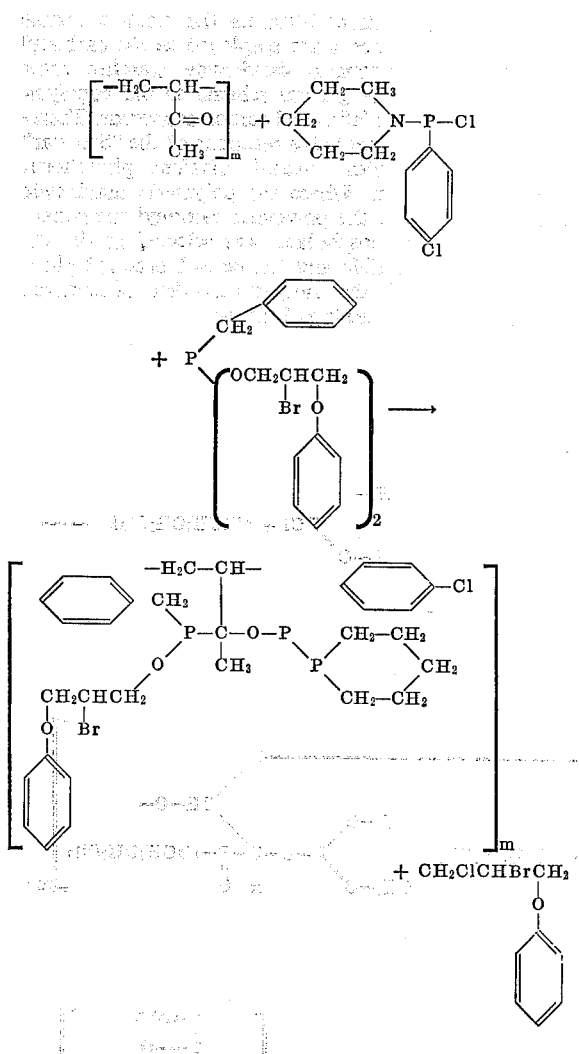

The following reactions illustrate the reaction mechanism wherein the polymeric carbonyl compound is a vinyl aldehyde polymer. The vinyl aldehyde polymers react according to the same generic scheme as the copolymerization products of olefins and carbon monoxide. Therefore only a few representative reactions of polycrotonaldehyde with selected trivalent phosphorus compounds are given. Where the polymeric carbonyl compound is polycrotonaldehyde, the trivalent phosphorus halide is 2-chloro-1,3,2-dioxaphospholane, and the triorgano trivalent phosphorus ester is tris-beta-chloroethyl phosphite, the reaction proceeds as follows:

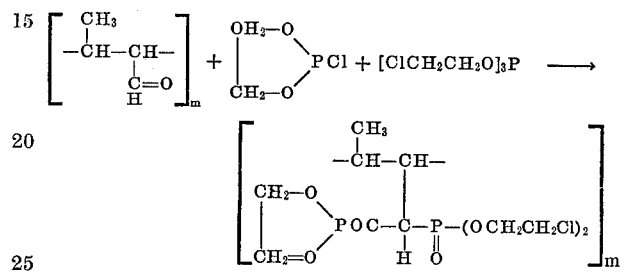

Where the polymeric carbonyl compound is polycrotonaldehyde, the trivalent phosphorus halide is N,N-diethylphenylphosphonamidous chloride, and the triorgano trivalent phosphorus ester is benzyl-bis(3 - phenoxy-2-bromopropyl)phosphite, the reaction proceeds as follows:

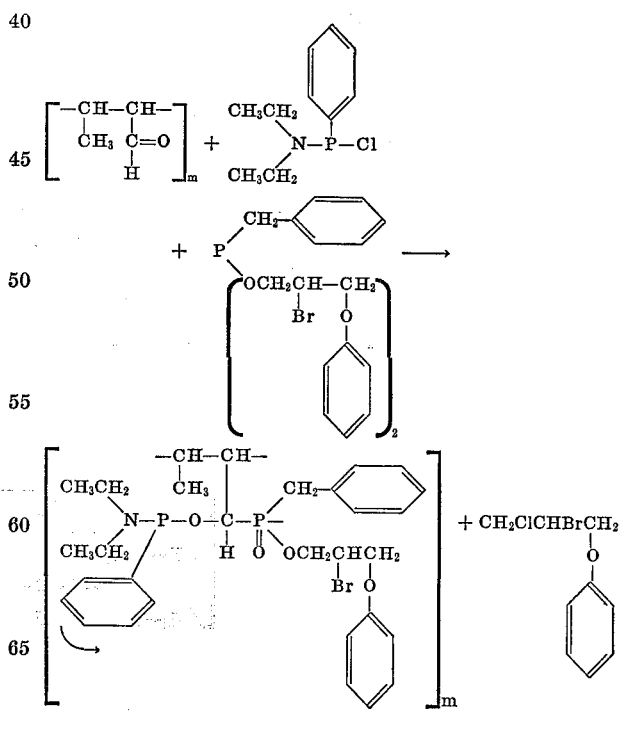

Where the polymeric carbonyl compound is polycrotonaldehyde, the trivalent phosphorus halide is S-(2- chloroethyl) - N - ethyl - N - phenylphosphoramidochloridothioite, and the triorgano trivalent phosphorus ester is tris(2-bromoethyl) phosphite, the reaction proceeds as follows:

and the triorgano trivalent phosphorus ester is tris(2-chloroethyl) phosphite, the reaction proceeds as follows:

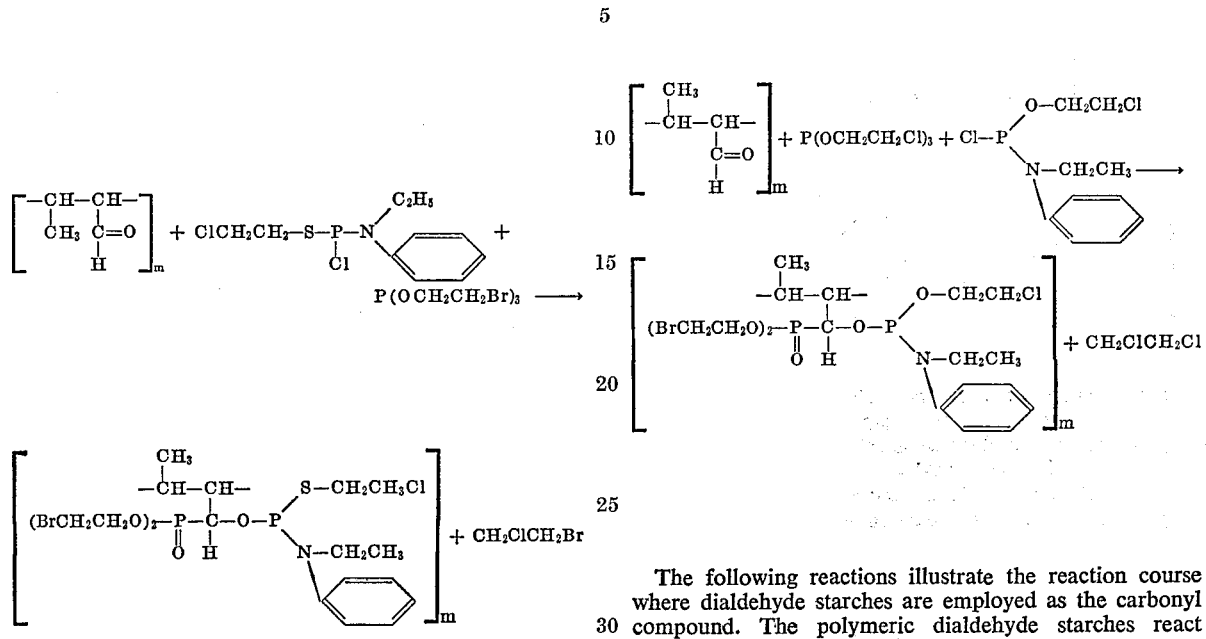

Where the polymeric carbonyl compound is polycrotonaldehyde, the trivalent phosphorus halide is 2-chloroethyl - N - ethyl - N - phenylphosphoramidochloridite, The following reactions illustrate the reaction course where dialdehyde starches are employed as the carbonyl compound. The polymeric dialdehyde starches react according to the same general scheme as the copolymerization products of olefins and carbon monoxide. Therefore, only a few representative reactions of the "Sumstar" dialdehyde starch with selected trivalent phosphorus compounds are given. Where the polymeric dialdehyde starch was selected as the polymeric carbonyl compound, 2-chloro-1,3,2-dioxaphospholane was selected as the trivalent phosphorus halide and tris beta-chloroethyl phosphite was selected as the triorgano trivalent phosphorus ester, the reaction proceeds as follows:

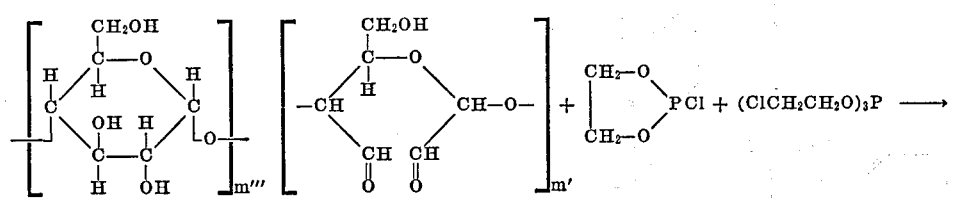

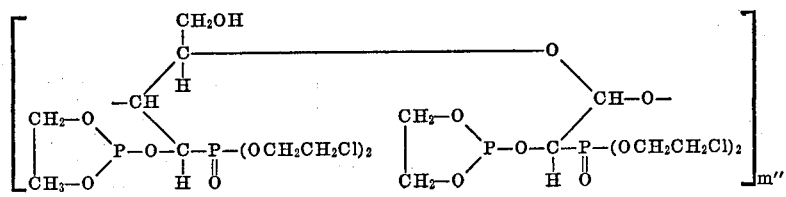

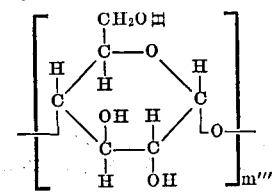

Where the "Sumstar" polymeric dialdehyde starch is selected as the polymeric carbonyl compound, S-phenyl-N, - N - di - n - butylphosphoramidochloridothioite is selected as the trivalent phosphorus halide and tris(2-chloroethyl) phosphite is selected as the triorgano trivalent phosphorus ester, the reaction proceeds as follows:

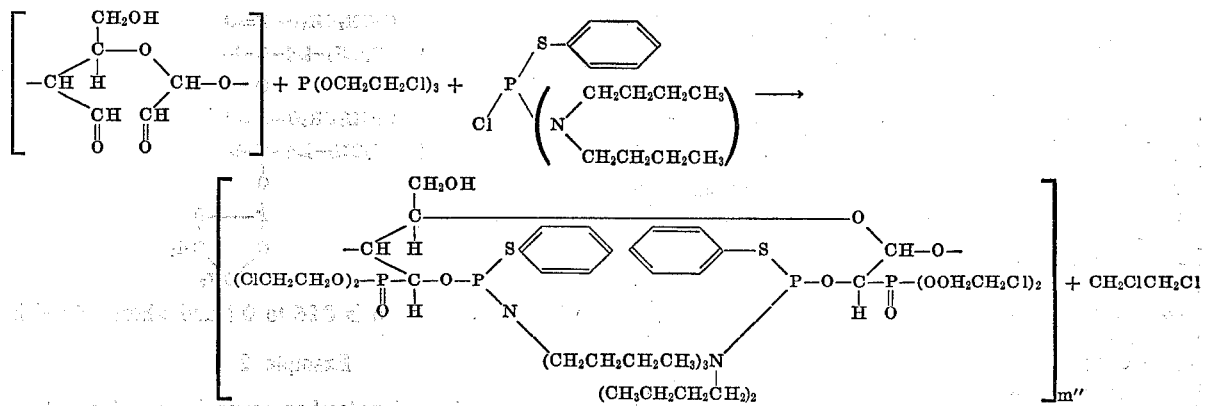

Where the "Sumstar" polymeric dialdehyde starch is selected as the polymeric carbonyl compound, O,S-bis-(4-chlorophenyl) phosphorochloridothioite is selected as the trivalent phosphorus halide and tris(3-methoxy-2-chloropropyl) phosphite is selected as te triorgano trivalent phosphorus ester, the reaction proceeds as follows:

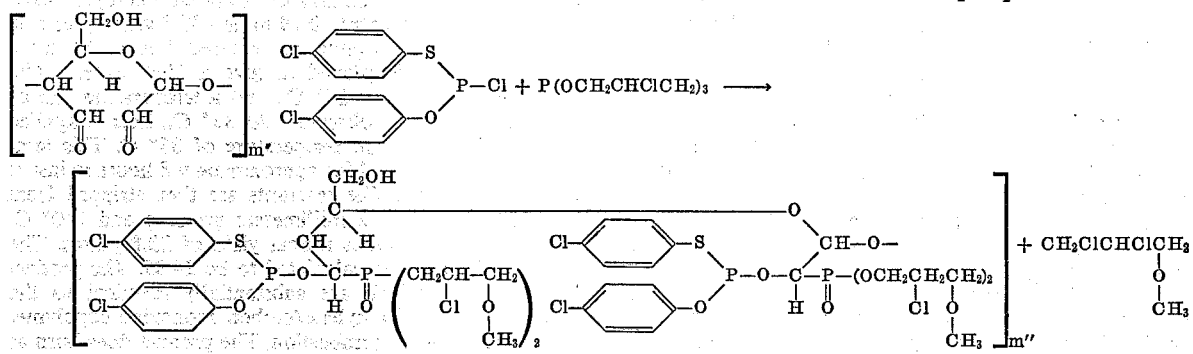

Where the "Sumstar" polymeric dialdehyde starch is selected as the polymeric carbonyl compound, S,S-bis(3-bromopropyl) phosphorobromidodithioite is selected as the trivalent phosphorus halide and tris-beta-chloroethyl phosphite is selected as the triorgano trivalent phosphorus ester, the reaction proceeds as follows:

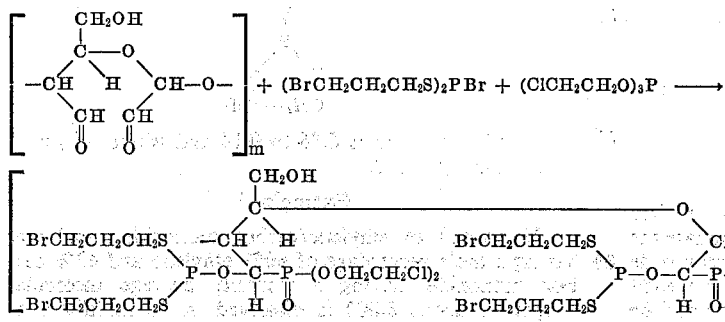

METHOD OF PREPARATION

The reaction between a trivalent phosphorus halide which does not undergo self-condensation, a polymeric carbonyl compound which reacts in preference at the carbonyl group and a triorgano trivalent phosphorus ester where one of the organic groups of said ester reactant is bonded to a phosphorus atom through an oxygen atom, takes place readily at room temperature and is fairly exothermic. In the case of the copolymers of olefins and carbon monoxide which exist in a solid state, and for that matter, the other polymeric carbonyl compounds which exist in a solid state, such compounds must be dissolved in an excess of a suitable solvent such as ortho-dichlorobenzene prior to the reaction. The dissolved polymeric carbonyl compound is then reacted with the trivalent phosphorus halide and the triorgano trivalent phosphorus ester in about stoichiometric proportions. The triorgano trivalent phosphorus ester is often added in excess amount to act as a stabilizer.

The three reactants are added in about a 1:1:1 ratio where it is desired to react all of the available unreacted carbonyl groups in the polymeric carbonyl compound. That is, one mole of a trivalent phosphorus mono-halide compound and one mole of a trivalent phosphorus ester is added for each mole of carbonyl radical contained within the polymer. Where it is desired to react only a selected mole percentage of the unreacted carbonyl groups in the polymeric carbonyl compound, that selected mole percentage of the trivalent phosphorus compound and triorgano trivalent phosphorus ester is used in the reaction. For example, if it is desired to react 75% of the available carbonyl moieties in the polymeric carbonyl compound, only .75 of a mole of trivalent phosphorus compound and .75 of a mole of triorgano trivalent phosphorus ester is reacted per mole of carbonyl present. The degree of reaction is determined by the desired phosphorus content which for effective flameproofing should not be less than about 0.3% and not more than about 3.0% by weight. Effective flameproofing is obtained with the minimum of about 0.3% phosphorus. However, when the compound contains beyond about 3.0% phosphorus, there may be a tendency to alter the physical characteristics of the original polymer.

The reactants may be all simultaneously mixed, or one of the reactants may be added to a mixture of the other two. This latter method is preferred inasmuch as the reaction is initially exothermic and gradual contact of the reactants lends to a smooth reaction.

The reactants are generally mixed at room temperature, or approximately 25° C., and the reaction normally proceeds exothermically. The temperature rise over a given period of time is usually affected by the particular reactants employed and the size of the bath, i.e., the volume of the reactants. When the total batch size or volume of reactants approximates 200 to 500 milliliters, a 10° to 12° C., rise in temperature is observed in a 10 to 15 minute period. After the initial temperature rise, heat is applied to bring the reaction temperature to approximately 85° C. At this temperature, the reaction is usually completed in approximately 1 hour again depending on the particular reactants and quantity employed. However, to insure complete reaction, the 85° temperature is maintained up to 8 hours.

When the reaction is substantially complete, the mixture of the polymeric product and any unreacted materials is preferably treated to remove any unreacted or excess phosphous halide or phosphorus ester which may have been used, by conventional techniques, such as by washing of the reaction mixture, distillation, solvent extraction, etc. For example, many of the esters employed in the present reaction, are not readily removable by distillation and therefore, the mixture of reaction product and ester is then dissolved in an excess of a suitable solvent such as benzene and the reaction product is solution precipitated by adding an excess of hexane. Thereafter, the product may be dried in a vacuum oven until complete dryness is attained.

Where the recommended percentages of phosphorus, namely about 0.3 to about 3.0% of phosphorus has been added to the polymeric carbonyl compound, the final product has substantially similar physical properties with respect to the original starting polymer; that is to say that such physical characteristics such as flexibility, hardness, etc., have not been significantly altered. However, very effective flameproofing is thus obtained. When a stoichiometric excess of the trivalent phosphorus halide is added in the reaction, oxidative instability or "carmelization" of the final reaction results. This oxidative instabilty is often highly desirable where biodegradability is sought. However, when it is desirable to achieve good oxidative and thermal stability, a stoichiometric excess of the triorgano trivalent phosphorus ester may be added.

EXAMPLES

The invention is further illustrated by but not limited to, the following examples.

Example 1

This example illustrates the effect of cross-linking when there is a lack of aryl or alkyl phosphites to terminate the reaction. 1 mole (28 gm.) of ethylene-carbon monoxide copolymer having a viscosity average molecular weight of approximately 35,001 and having a composition of 0.86 mole of ethylene and 0.14 mole of carbon monoxide is dissolved in 20 milliliters of orthodichlorobenzene and is reacted with 0.14 mole (17.5 grams) of 2-chloro-1,3,2-dioxaphospholane in a test tube for approximately 1 hour. The reactants are mixed at approximately 25° C. and after ten minutes rises exothermically to 33° C. The mixture is then heated to a reaction temperature of 58° C. and heat is maintained for 16 hours to insure complete reaction. The final product is precipitated in approximately 2 liters of hexane and dried in a vacuum oven for approximately 8 hours at 90° C. at 3 millimeters mercury pressure. The final product is an oily mixture which does not support combustion and readily displays considerable cross-linking of polymer chains. The reaction product has the following structure:

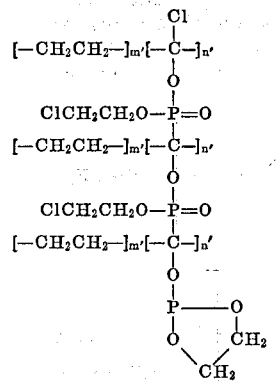

where $m'$ to $n'$ ratio is 0.86 to 0.1 and where $m'+n'$ is approximately 1200.

Example 2

1 mole of ethylene/carbon monoxide copolymer having a mole ratio of 0.86 mole of ethylene to 0.14 mole of carbon monoxide having a viscosity average molecular weight of approximately 35,000 is dissolved in 20 milliliters of ortho-dichlorobenzene, and is reacted with .14 mole (17.5 grams) of 2-chloro-1,3,2-dioxaphospholane and .14 mole (41.4 grams) of tris(2-chloroethyl) phosphite in a test tube. Only 0.14 mole (37.7 grams) of tris-(2-chloroethyl) phosphite is required but 0.154 mole (41.4 grams) is employed to give a 10% excess. The reaction is initiated at 27° C., and a temperature rise of 6° in 14 minutes is observed. At 33° C., heat is applied to maintain a reaction temperature of 85° C. This temperature is maintained for approximately 8 hours to insure complete reaction. The reactants are then stripped from the final product at 2 millimeters pressure and 140° C. temperature to produce a final yield of 23.8 grams. The theoretical yield was calculated to be 24.85. The product has properties which are substantially identical to the original charge of ethylene/carbon monoxide copolymer and do not support combustion. The product does burn as long as a flame is applied but does not support combustion when the flame is removed. The reaction product has the following structure:

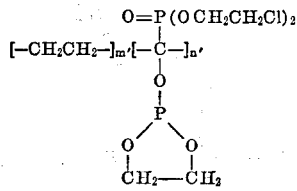

where $m'$ to $n'$ ratio is 0.86 to 0.14 and where $m'+n'$ is approximately 1200.

Example 3

(28 grams) of ethylene/carbon monoxide copolymer having a mole percentage of 60% ethylene and 40% carbon monoxide, having a viscosity average molecular weight of about 6,000 is dissolved in 20 milliliters of ortho-dichlorobenzene. The dissolved ethylene/carbon monoxide copolymer is reacted with 0.4 mole (50.2) grams) of 2-chloro-1,3,2-dioxaphospholane and 0.4 mole (90 grams) of tris(2-chloroethyl) phosphite in a test tube. 10% less than the theoretical amount of tris(2-chloroethyl) phosphite is actually charged so that complete reaction of 2-chloro-1,3,2-dioxaphospholane is insured, inamuch as the ester cannot be removed by distillation.

The three reactants are mixed at 30° C. and in 8 minutes achieve a 15° temperature rise to 45° C. Heat is then applied to raise and maintain the reaction temperature at 80° C. which is maintained for approximately 8 hours to insure complete reaction. The final product is distilled at 3 millimeters pressure and 135° C. temperature to remove the dichlorobenzene and the unreacted 2-chloro-1,3,2-dioxaphospholane. The product is then dissolved in 250 milliliters of benzene and precipitated by adding thereto 2 liters of hexane. The product is then dried for approximately 36 hours at 90° C. in a vacuum oven and a yield of 52.1 grams is achieved. The theoretical yield is 51.98. The reaction product has a structure similar to the structure of the product in Example 2 except that the reaction product of Example 3 had a larger percentage of reacted carbonyl moieties. The value of $m'$ to $n'$ ratio is .60 to .40 and $m'+n'$ is approximately 206.

The properties of the final product are substantially identical to the properties of the original ethylene/carbon monoxide and do not support combustion. However, it is found that the product carmelizes which indicates oxidative thermal degradation takes place. The product in Example 2 did not carmelize inasmuch as an excess of tris-(2-chloroethyl) phosphite was added and this reactant acted as a stabilizer. Moreover, since 10% of the carbonyl groups were unreacted, instability by way of oxidation was further promoted.

Example 4

1 mole (28 grams) of ethylene/carbon monoxide copolymer having a mole percentage of 60% ethylene and 40% carbon monoxide having a viscosity average molecular weight of about 360 is dissolved in 20 millimeters of ortho-dichlorobenzene. The dissolved ethylene/carbon monoxide copolymer is reacted with 0.44 mole (55.2 grams) of 2-chloro-1,3,2-dioxaphospholane and 0.44 mole (119 grams) of tris(2-chloroethyl)phosphite in a test tube. The tris(2-chloroethyl) phosphite and the 2-chloro-1,3,2-dioxaphospholane are added in quantities which are 10% in excess of the theoretically required amounts for reaction with all of the carbonyl groups.

The reactants are mixed at 30° C. and initially heated to a temperature of 105° C. The temperature is allowed to drop to 83° C. for 30 minutes and heat is again applied to maintain a reflux temperature of 183° C. for 8 hours. The final product is distilled at 3 millimeters pressure and 135° C. temperature to remove the dichlorobenzene and unreacted 2-chloro-1,3,2-dioxaphospholane. The product is then dissolved at 250 milliliters of benzene and precipitated by adding thereto 2 liters of hexane. Finally, the product is dried in a vacuum oven at 90° C. until a completely dried product is attained giving a final yield of 59.26 grams. The reaction product has a structure similar to the structure of the product in Example 3. The value of $m'$ to $n'$ ratio is .60 to .40 and $m'+n'$ is approximately 12.5.

The final product does not "carmelize" inasmuch as an excess of tris(2-chloroethyl)phosphite was added. The product does not support combustion. This example represents the lower limit of polymer structure suitable for use in the present invention.

Example 5

0.145 mole (10.0 grams) of poly methyl vinyl ketone having a degree of polymerization of about 500 and a weight average molecular weight of 35,000 is added to 20 milliliters of ortho-dichlorobenzene and is mixed with 0.145 mole (39.0 grams) of tris(2-chloroethyl)phosphite and 0.145 mole (18.3 grams) of 2-chloro-1,3,2-dioxaphospholane. These reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus halide, 2-chloro-1,3,2-dioxaphospholane. The reaction product is then dissolved in 250 milliliters of benzene and precipitated by adding the solution to 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

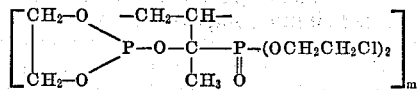

and where $m$ is approximately 500.

Example 6

0.09 mole (10.0 grams) of poly(sec.-butyl vinyl ketone) with a viscosity average molecular weight of approximately 4500 is added to 20 milliliters of ortho-dichlorobenzene and is reacted with 0.09 mole (11.4 grams) of 1,3-dioxa-2-chlorophospholane and 0.09 mole (24.3 grams) of tris(2-chloroethyl)phosphite. The three reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at reduced (3 millimeters) pressure and 150° C. temperature to remove the ortho-dichlorobenzene and the unreacted trivalent phosphorus compound, 1,3-dioxa-2-chlorophospholane. The reaction product is then dissolved in 250 milliliters of benzene and precipitated by adding the resulting solution to 2 liters of hexane in order to separate the polymer from the excess triorgano trivalent phosphorus ester, tris (2-chloroethyl)phosphite. The product is then dried for approximately 12 to 18 hours at 90° C. in a vacuum oven and has the following structure:

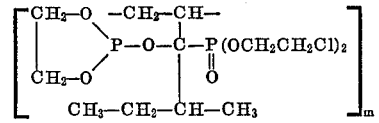

and where $m$ is approximately 40.

Example 7

0.145 mole (10.0 grams) of poly(methyl vinyl ketone) with a viscosity average molecular weight of approximately 4500 is added to 20 milliliters of ortho-dichlorobenzene and is reacted with 0.0725 mole (9.15 grams) of 1,3-dioxa-2-chlorophospholane and 0.0725 mole (19.5 grams) of tris(2-chloroethyl)phosphite. The three reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

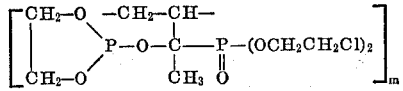

where $m$ is approximately 40.

Example 8

0.143 mole (10.0 grams) of poly crotonaldehyde with a weight average molecular weight of about 10,000 as determined by light sintering measurement is added to 20 milliliters of ortho-dichlorobenzene and is reacted with 0.143 mole (18.05 grams) of 1,3-dioxa-2-chlorophospholane and 0.143 mole (38.3 grams) of tris(2-chloroethyl)phosphite. These reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

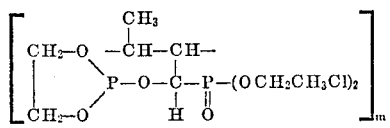

where $m$ is approximately 143.

Example 9

0.0625 mole (10.0 grams) of "Sumstar" dialdehyde starch with a weight average molecular weight in its native unoxidized form in excess of 1,000,000, is added to 20 milliliters of orthodichlorobenzene and is reacted with 0.0625 mole (7.9 grams) of 1,3-dioxa-2-chlorophospholane and 0.0625 mole (16.8 grams) of tri(2-chloroethyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chloro-phospholane. The reaction products are then dissolved in 250 milliliters of benzene and precipitated in 2 liters of hexane in order to separate the polymer from the excess triorgano trivalent phosphorus ether, tris(2-chloroethyl)phosphite. The product is then dried for approximately 12 to 18 hours at 90° C. in a vacuum oven and has the following structures:

mately 77,000 is added to 20 milliliters of ortho-dichlorobenzene and is reacted with 0.145 mole (25.3 grams) of ethyl methyl phosphorochlorodothioite and 0.145 mole (19.5 grams) of tris(2-chloroethyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, ethyl methyl phosphorochlorodothioite. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

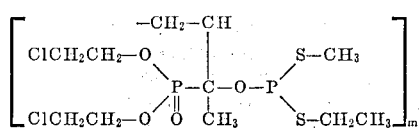

where $m$ is approximately 1100.

Example 11

0.0625 mole (10.0 grams) of "Sumstar" dialdehyde starch with a weight average molecular weight in its native unoxidized form in excess of 1,000,000 is added to 20 milliliters of orthodichlorobenzene and is reacted with 0.0625 mole (25.3 grams) of ethyl methyl phosphorochlorodothioite and 0.0625 mole (19.5 grams) of tris-(2-chloroethyl)phosphite. The initial reactants are mixed at approximately 25° C. and after 10 minutes of reacting time, heat is applied to raise the reaction temperature to

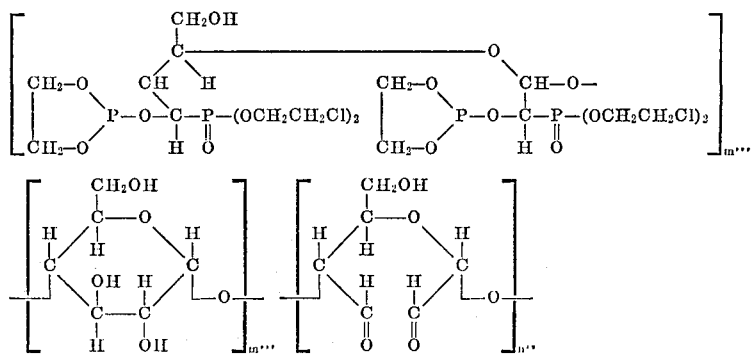

and where $m'''$ ranges from 1 mole percent to 50 mole percent of the sum of $m'''+n''$, and $n''$ ranges from 0 mole percent to 40 mole percent and preferably from 0 mole percent to 25 mole percent of the sum of $m'''+n''$, and where $m'''$, $m''$, and $n''$ are approximately respectively 0, 800, and 200.

Example 10

0.145 mole (10.0 grams) of poly(methyl vinyl ketone) with a viscosity average molecular weight of approxi- 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, ethyl methyl phosphorochlorodothioite. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

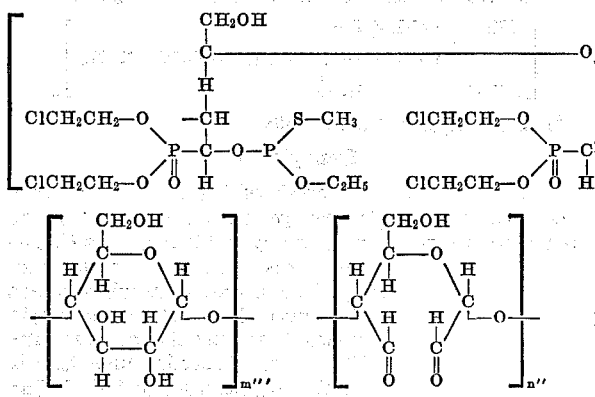

and where $m'''$ ranges from 1 mole percent to 50 mole percent of the sum of $m'''+m''+n''$ and $n''$ ranges from 0 mole percent to 40 mole percent and preferably from 0 mole percent to 25 mole percent of the sum of $m''+n''$, and where $m'''$, $m''$, $n''$ are approximately respectively 1000, 7000, and 2000.

Example 12

0.145 mole (10.0 grams) of poly(methyl vinyl ketone) with a viscosity average molecluar weight of 850,000 is added to 20 milliliters of ortho-dichlorobenzene and is reacted with 0.145 mole (36.7 grams) of diphenyl phosphorochloridite and 0.145 mole (19.5 grams) of tris(2-chloroethyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, diphenyl phosphorochloridite. The reaction products are then dissolved in 250 milliliters of benzene and precipitated in 2 liters of hexane in order to separate the polymer from the excess triorgano trivalent phosphorus esters, tris(2-chloroethyl)phosphite. The product is then dried for approximately 12 to 18 hours at 90° C. in a vacuum oven and has the following structure:

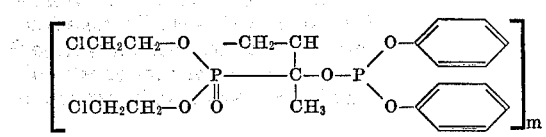

where $m$ is approximately 12,100.

Example 13

0.143 mole (10.0 grams) of polycrotonaldehyde with a number average molecular weight of about 9100 is added to 20 milliliters of ortho-dichlorobenzene and is reacted with 0.143 mole (36.7 grams) of diphenyl phosphorochloridite and 0.143 mole (38.3 grams) of tris(2-chloroethyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, diphenyl phosphorochloridite. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

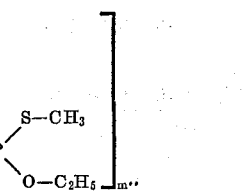

where $m$ is approximately 130.

Example 14

0.143 mole (10.0 grams) of poly(methyl vinyl ketone) with a weight average molecular weight of about 2100 is added to 20 milliliters of ortho-dichlorobenzene and is reacted with 0.143 mole (41.7 grams) of phenyl N,N-di-butyl-phosphoramidochloridite and 0.143 mole (19.5 grams) of tris(2-chloroethyl)phosphite. The initial reactants are mixed at approximately 25° C. and after 10 minutes of reacting time, heat is applied to raise the reaction temperature to 80° C. The reactants are maintained at the 80° temperature for at least 8 hours to insure complete reaction.

The reactants are next distilled at 3 millimeters pressure and 150° C. temperature to remove the ortho-dichlorobenzene and the unreacted trivalent phosphorus compound, phenyl N,N-di-n-butylphosphoramidochloridite. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

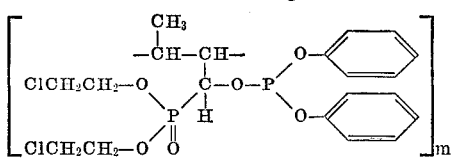

where $m$ is approximately 30.

Example 15

0.375 mole (10.0 grams) of ethylene/carbon monoxide with a viscosity average molecular weight of approximately 29,000 having a composition of 0.6 mole of ethylene and 0.4 mole of carbon monoxide, is added to 20 milliliters of orthodichlorobenzene and is reacted with 0.145 mole (16.7 grams) of phenyl N,N-di-n-butylphosphoramidochloridite and 0.145 mole (43.49 grams) of tris(2-chloroethyl)phosphite. The initial reactants are mixed at approximately 25° C. and after 10 minutes of reaction time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, phenyl N,N - di - n - butylphosphoramidochloridite. The reaction products are then dissolved in 250 milliliters of benzene and precipitated in 2 liters of hexane in order to separate the polymer from the excess triorgano trivalent phosphorus ester, tris(2-chloroethyl)phosphite. The product is then dried for approximately 12 to 18 hours at 90° C. in a vacuum oven and has the following structure:

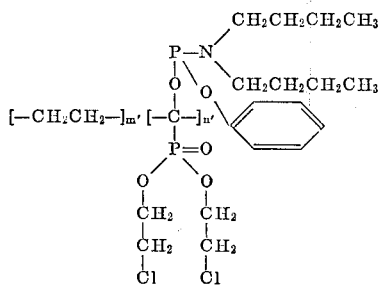

where $m'$ to $n'$ ratio is 3 to 2 and $m'+n'$ is approximately 730.

Example 16

0.145 mole (10.0 grams) of poly(methyl vinyl ketone) with a viscosity average molecular weight of approximately 4500 is added to 20 milliliters of ortho-dichlorobenzene and is reacted with 0.145 mole (18.3 grams) of 1,3-dioxa-2-chlorophospholane and 0.145 mole (105.0 grams) of tris(2-bromoethyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressures and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tris(2-bromoethyl)phosphite. The product is then dried for approximately 12 to 18 hours at 90° C. in a vacuum oven and has the following structure:

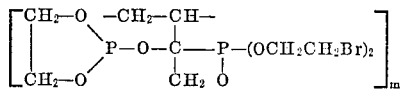

where $m$ is approximately 40.

Example 17

0.145 mole (10.0 grams) of poly(methyl vinyl ketone) with a viscosity average molecular weight of approximately 77,000 is added to 20 milliliters of ortho-dichlorobenzene and is reacted with 0.145 mole (18.3 grams) of 1,3-dioxa - 2 - chlorophospholane and 0.145 mole (66.6 grams) of tris(3,4-dichlorobutyl)phosphite. The initial reactants are mixed at approximately 25° C., and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tris(3,4-dichlorobutyl)phosphite. The product is then dried for approximately 12 to 18 hours at 90° C., in a vacuum oven and has the following structure:

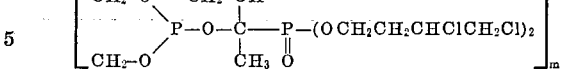

where $m$ is approximately 1100.

Example 18

0.0625 mole (10.0 grams) of "Sumstar" dialdehyde starch with a weight average molecular weight in its native unoxidized form in excess of 1,000,000 is added to 20 milliliters of orthodichlorobenzene and is reacted with 0.0625 mole (7.9 grams) of 1,3-dioxa-2-chlorophospholane and 0.0625 mole (28.7 grams) of tris(3,4-dichlorobutyl) phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tri(3,4-dichlorobutyl)phosphite. The product is then dried for approximately 12 to 18 hours at 90° C. in a vacuum oven and has the following structure:

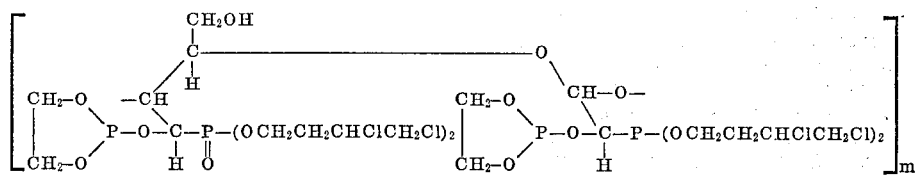

and where $m'''$ ranges from 1 mole percent to 50 mole percent of the sum of $m'''+m''+n''$ and $n''$ ranges from 0 mole percent to 40 mole percent and preferably from 0 mole percent to 25 mole percent of the sum of $m''+n''$, and where $m'''$, $m''$, and $n''$ are approximately respectively 2, 7, and 1.

Example 19

0.09 mole (10.0 grams) of poly(sec-butyl vinyl ketone) with a weight average molecular weight of approximately 130,000 is added to 20 milliliters of ortho-dichlorobenzene and is reacted with 0.09 mole (11.4 grams) of 1,3-dioxa-2-chlorophospholane and 0.09 mole (32.0 grams) of tris(3-methoxy 2-chloropropyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, tris(3-methoxy-2-chloropropyl)phosphite. The product is then dried for approximately 12 to 18 hours at 90° C. in a vacuum oven and has the following structure:

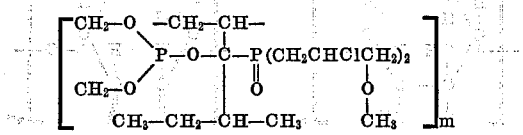

where m is approximately 1,160.

Example 20

0.09 mole (10.0 grams) of poly(sec-butyl vinyl ketone) with a weight average molecular weight of approximately 40,500 is added to 20 milliliters of ortho-dichlorobenzene and is reacted with 0.09 mole (11.4 grams) of 1,3-dioxa-2-chlorophospholane and 0.09 mole (45.5 grams) of phenyl bis-(3-phenoxy-2-bromopropyl) phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ether, phenyl-bis(3-phenoxy-2-bromopropyl) phosphite. The product is then dried for approximately 12 to 18 hours at 90° C. in a vacuum oven and has the following structure:

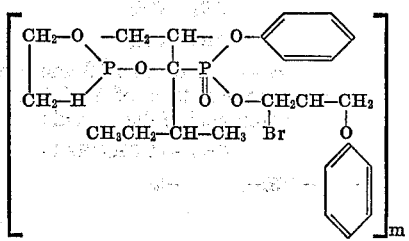

where m is approximately 360.

Example 21

0.357 mole (10.0 grams) of ethylene carbon monoxide copolymer having a composition of 0.6 mole of ethylene and 0.4 mole of carbon monoxide and having a viscosity average molecular weight of about 6000 is added to 20 milliliters of ortho-dichlorobenzene and is reacted with 0.143 mole (18.00 grams) of 1,3-dioxa-2-chlorophospholane and 0.143 mole (37.5 grams) of benzyl bis-(3-phenoxy-2-bromophenyl)phosphite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, 1,3-dioxa-2-chlorophospholane. The reaction products are then dissolved in 250 milliliters of benzene and precipitated in 2 liters of hexane in order to separate the polymer from the excess triorgano trivalent phosphorus ester, benzyl bis-(3-phenoxy-2-bromophenyl)phosphonite. The product is then dried for approximately 12 to 18 hours at 90° C. in a vacuum oven and has the following structure:

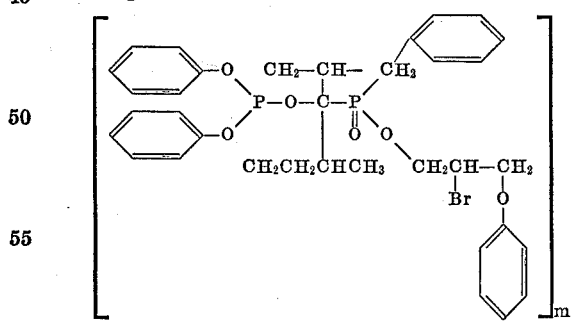

The value of $m'$ to $n'$ ratio is .60 to .50 and $m'+n'$ is approximately 12.5.

Example 22

0.09 mole (10.0 grams) of poly(sec-butyl vinyl ketone) with a viscosity average molecular weight of about 7200 is added to 20 milliliters of ortho-dichlorobenzene and is reacted with 0.09 mole (22.8 grams) of diphenyl phosphorochloridite and 0.09 mole (45.5 grams) of benzyl bis-(3-phenoxy-2-bromopropyl)phosphonite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, diphenyl phosphorochloridite. The reaction products are then dissolved in 250 milliliters of benzene and precipitated in 2 liters of hexane in order to separate the polymer from the excess triorgano trivalent phosphorus ester, benzyl bis-(3-phenoxy-2-bromopropyl)phosphonite. The product is then dried for approximately 12 to 18 hours at 90° C. in a vacuum oven and has the following structure:

where $m$ is approximately 1100.

Example 23

0.143 mole (10.0 grams) of polycrotonaldehyde with a weight average molecular weight of approximately 11,000 determined by light scattering measurment is added to 20 milliliters of ortho-dichlorobenzene and is reacted with 0.143 mole (36.3 grams) of diphenyl phosphorochloridite and 0.143 mole (72.2 grams) of benzyl bis-(3-phenoxy-2-bromopropyl)phosphonite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, diphenyl phosphorochloridite. The reaction products are then dissolved in 250 milliliters of benzene and precipitated in 2 liters of hexane in order to separate the polymer from the excess triorgano trivalent phosphorus ester, benzyl bis-(3-phenoxy-2-bromopropyl)phosphonite. The product is then dried for approximately 12 to 18 hours at 90° C. in a vacuum oven and has the following structure:

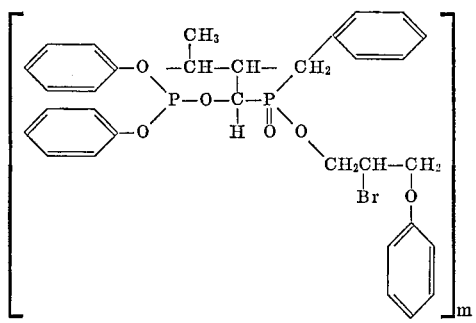

where $m$ is approximately 143.

Example 24

0.0625 mole (10.0 grams) of "Sumstar" dialdehyde starch with a weight average molecular weight in its native unoxidized form in excess of 1,000,000 is added to 20 milliliters of ortho-dichlorobenzene and is reacted with 0.0625 mole (18.0 grams) of phenyl N,N-di-n-butylphosphoramidochloridite and 0.0625 mole (31.5 grams) of benzyl bis-(3-phenoxy-2-bromopropyl)phosphonite. The initial reactants are mixed at approximately 25° C. and after 10 minutes of reacting time, heat is applied to raise the reaction temperature to 80° C. The reactants are maintained at the 80° C. temperature for at least 8 hours to insure complete reaction.

The reactants are next distilled at 3 millimeters pressure and 150° C. temperature to remove the ortho-dichlorobenzene and the unreacted trivalent phosphorus compound, phenyl N,N-di-n-butylphosphoramidochloridite. The reaction products are then dissolved in 250 milliliters of benzene and precipitated in 2 liters of hexane in order to separate the polymer from the excess triorgano trivalent phosphorus ester, benzyl bis-(3-phenoxy-2-bromopropyl) phosphonite. The product is then dried for approximately 12 to 18 hours at 90° C. in a vacuum oven and has the following structure:

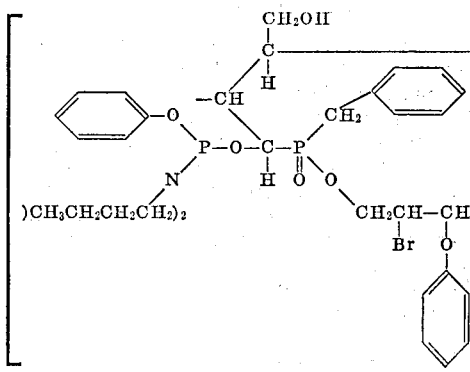

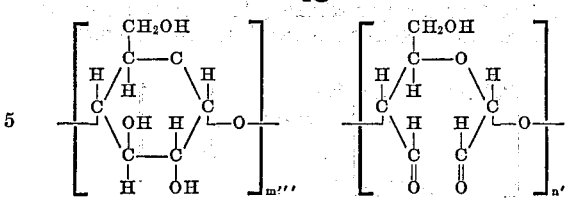

and where $m'''$ ranges from 1 mole percent to 50 mole percent of the sum of $m'''+m''+n''$ and $n''$ ranges from 0 mole percent to 40 mole percent and preferably from 0 mole percent to 25 mole percent of the sum of $m''+n''$, and where $m'''$, $m''$ and $n''$ are approximately respectively 0, 60, and 40.

Although the invention has been described in terms of specific embodiments which are set forth in considerable detail, it should be understood that this was done for illustrative purposes only, and that the invention is not necessarily limited thereto since alternative embodiments and operating techniques will become apparent to those skilled in the art in view of the disclosure herein. Accordingly, other modifications are contemplated which can be made without departing from the nature and spirit of the described invention.

Having thus described our invention, what we desire to claim and secure by Letters Patent is:

1. The polymeric compound of the formula

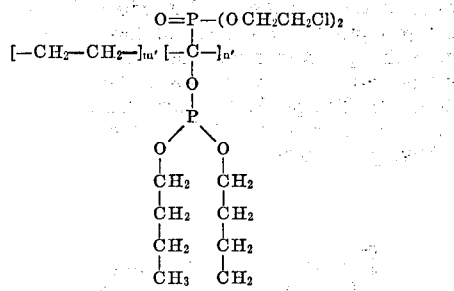

wherein the sum of $m'+n'$ is at least 10 and wherein $m'$ exists in a range with respect to $n'$ of 50:1 to 1:1.

2. The polymeric compound of the formula

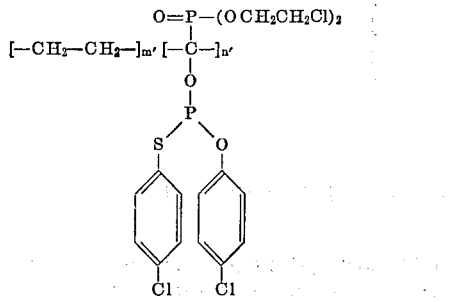

wherein the sum of $m'+n'$ is at least 10 and wherein $m'$ exists in a range with respect to $n'$ of 50:1 to 1:1.

3. The polymeric compound of the formula
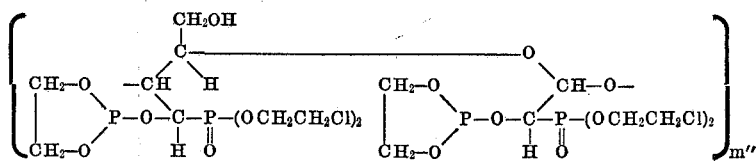
wherein $m''$ is an integer of at least 3.
4. The polymeric compound of the formula
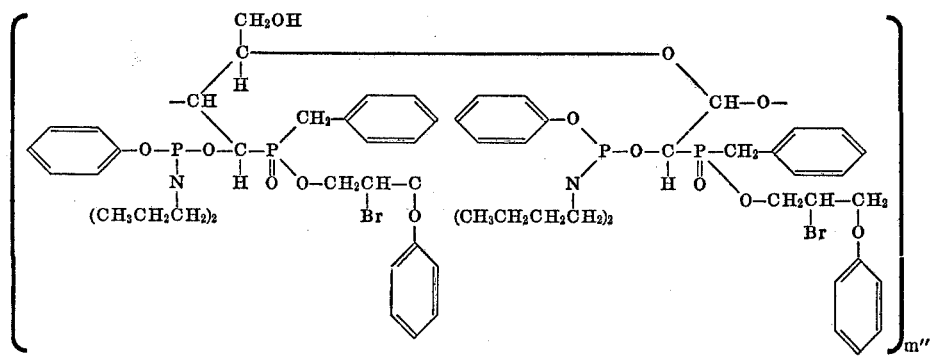
wherein $m''$ is an intger of at least 3.
References Cited
UNITED STATES PATENTS
3,014,944    12/1961    Birum _____ 260—461
WILLIAM H. SHORT, Primary Examiner
L. L. LEE, Assistant Examiner
U.S. Cl. X.R.
260—33.6 PQ, 33.6 UA, 37 R, 63 R, 63 CQ, 67 UA, 927 R, 931, 972, Dig 24